(12) United States Patent
Inukai et al.

(10) Patent No.: US 12,475,722 B2
(45) Date of Patent: Nov. 18, 2025

(54) DISPLAY SYSTEM, ROAD SURFACE UNDULATION ESTIMATION DEVICE, AND DISPLAY METHOD

(71) Applicant: Panasonic Automotive Systems Co., Ltd., Kanagawa (JP)

(72) Inventors: Fumihito Inukai, Kyoto (JP); Toshiya Mori, Osaka (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 47 days.

(21) Appl. No.: 18/598,921

(22) Filed: Mar. 7, 2024

(65) Prior Publication Data
US 2024/0312227 A1 Sep. 19, 2024

(30) Foreign Application Priority Data

Mar. 17, 2023 (JP) ................. 2023-043255

(51) Int. Cl.
*G06V 20/56* (2022.01)
*G06T 5/50* (2006.01)
(Continued)

(52) U.S. Cl.
CPC ............ *G06V 20/588* (2022.01); *G06T 5/50* (2013.01); *G06T 5/70* (2024.01); *G06T 7/60* (2013.01);
(Continued)

(58) Field of Classification Search
CPC ............ B60W 40/06; B60W 2552/15; B60W 2552/20; B60W 2552/25; G06T 7/60;
(Continued)

(56) References Cited

U.S. PATENT DOCUMENTS

2017/0206425 A1 7/2017 Iida
2021/0389469 A1* 12/2021 Sakata ................. B60W 50/14
(Continued)

FOREIGN PATENT DOCUMENTS

| JP | 6138293 | 5/2017 |
| JP | 2019-051734 | 4/2019 |
| JP | 2023095260 A * | 7/2023 |

*Primary Examiner* — Peet Dhillon
(74) *Attorney, Agent, or Firm* — GREENBLUM & BERNSTEIN, P.L.C.

(57) ABSTRACT

A display system includes: a road surface undulation estimator that estimates undulation of a road surface; a superimposing position determiner that determines, based on the estimated undulation, a superimposing position at which content is to be displayed by being superimposed on a foreground; and a display that displays the content with the content superimposed on the foreground at the determined superimposing position. The road surface undulation estimator includes: a road surface undulation information obtainer that obtains road surface undulation information items indicating the undulation at points and being calculated based on images generated when an imager provided to a mobile body performs image capturing a plurality of times; a determiner that determines whether or not the obtained road surface undulation information items each satisfy a predetermined condition; and an estimator that estimates the undulation based on road surface undulation information items which have been determined to satisfy the predetermined condition.

15 Claims, 15 Drawing Sheets

(51) Int. Cl.
*G06T 5/70* (2024.01)
*G06T 7/60* (2017.01)
*G06T 7/70* (2017.01)

(52) U.S. Cl.
CPC ...... *G06T 7/70* (2017.01); *G06T 2207/20221* (2013.01)

(58) Field of Classification Search
CPC .... G06T 7/70; G06T 5/50; G06T 5/70; G06T 2207/20221; G06V 20/588
See application file for complete search history.

(56) References Cited

U.S. PATENT DOCUMENTS

2022/0067398 A1\* 3/2022 Tamura ............. B60W 60/0053
2022/0254064 A1\* 8/2022 Tang ................... B60W 40/02

\* cited by examiner (a) Offset road surface undulation information items outside horizontal thresholds by predetermined value (e.g., 1 m)

(b) Estimate undulation from offset road surface undulation information items and road surface undulation information items within horizontal thresholds

| Absolute difference | Point a | Point b | Point c | Number of times difference is above threshold (is greater than or equal to 0.5 m) |
|---|---|---|---|---|
| Point a | — | 1.7m | 0.3m | 1 |
| Point b | 1.7m | — | 1.4m | 2 |
| Point c | 0.3m | 1.4m | — | 1 |

DISPLAY SYSTEM, ROAD SURFACE UNDULATION ESTIMATION DEVICE, AND DISPLAY METHOD

CROSS REFERENCE TO RELATED APPLICATION

The present application is based on and claims priority of Japanese Patent Application No. 2023-043255 filed on Mar. 17, 2023.

FIELD

The present disclosure relates to a display system, a road surface undulation estimation device, and a display method.

BACKGROUND

Studies have been conducted for displaying content by superimposing the content on objects ahead of a mobile body in a manner that reflects the undulation of a road surface ahead of the mobile body. For example, Patent Literature 1 (PTL 1) discloses a technique of estimating the undulation of a road surface ahead of a mobile body by calculating the three-dimensional positions (three-dimensional information) of objects ahead in a real space using camera-captured images of the surroundings of the vehicle. Patent Literature 2 discloses a technique of utilizing the undulation of a road surface to display content superimposed on objects ahead.

CITATION LIST

Patent Literature

PTL 1: Japanese Patent No. 6138293
PTL 2: Japanese Unexamined Patent Application Publication No. 2019-51734

SUMMARY

However, the techniques according to PTLs 1 and 2 can be improved upon.

In view of this, the present disclosure provides a display system, a road surface undulation estimation device, and a display method capable of improving upon the above related art.

In accordance with an aspect of the present disclosure, a display system includes: a road surface undulation estimator that estimates undulation of a road surface; a superimposing position determiner that determines, based on the undulation estimated by the road surface undulation estimator, a superimposing position at which a content is to be displayed by being superimposed on a foreground; and a display that displays the content with the content being superimposed on the foreground, at the superimposing position determined by the superimposing position determiner, wherein the road surface undulation estimator includes: a road surface undulation information obtainer that obtains a plurality of road surface undulation information items indicating the undulation of the road surface at a plurality of points, the road surface undulation information items being calculated based on a plurality of images generated when an imager provided to a mobile body performs image capturing a plurality of times; a determiner that determines whether or not each of the plurality of road surface undulation information items obtained by the road surface undulation information obtainer satisfies a predetermined condition; and an estimator that estimates the undulation of the road surface based on one or more road surface undulation information items which are determined by the determiner to satisfy the predetermined condition among the plurality of road surface undulation information items.

In accordance with another aspect of the present disclosure, a road surface undulation estimation device includes: a road surface undulation information obtainer that obtains a plurality of road surface undulation information items indicating the undulation of the road surface at a plurality of points, the road surface undulation information items being calculated based on a plurality of images generated when an imager provided to a mobile body performs image capturing a plurality of times; a determiner that determines whether or not each of the plurality of road surface undulation information items obtained by the road surface undulation information obtainer satisfies a predetermined condition; and an estimator that estimates the undulation of the road surface based on one or more road surface undulation information items which are determined by the determiner to satisfy the predetermined condition among the plurality of road surface undulation information items.

In accordance with still another aspect of the present disclosure, a display method includes: obtaining a plurality of road surface undulation information items indicating the undulation of the road surface at a plurality of points, the road surface undulation information items being calculated based on a plurality of images generated when an imager provided to a mobile body performs image capturing a plurality of times; determining whether or not each of the plurality of road surface undulation information items obtained in the obtaining satisfies a predetermined condition; estimating the undulation of the road surface based on one or more road surface undulation information items which are determined in the determining to satisfy the predetermined condition among the plurality of road surface undulation information items; determining that determines, based on the undulation estimated, a superimposing position at which a content is to be displayed by being superimposed on a foreground; displaying the content with the content being superimposed on the foreground, at the superimposing position determined.

An aspect of the present disclosure can achieve a display system and other implementations capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
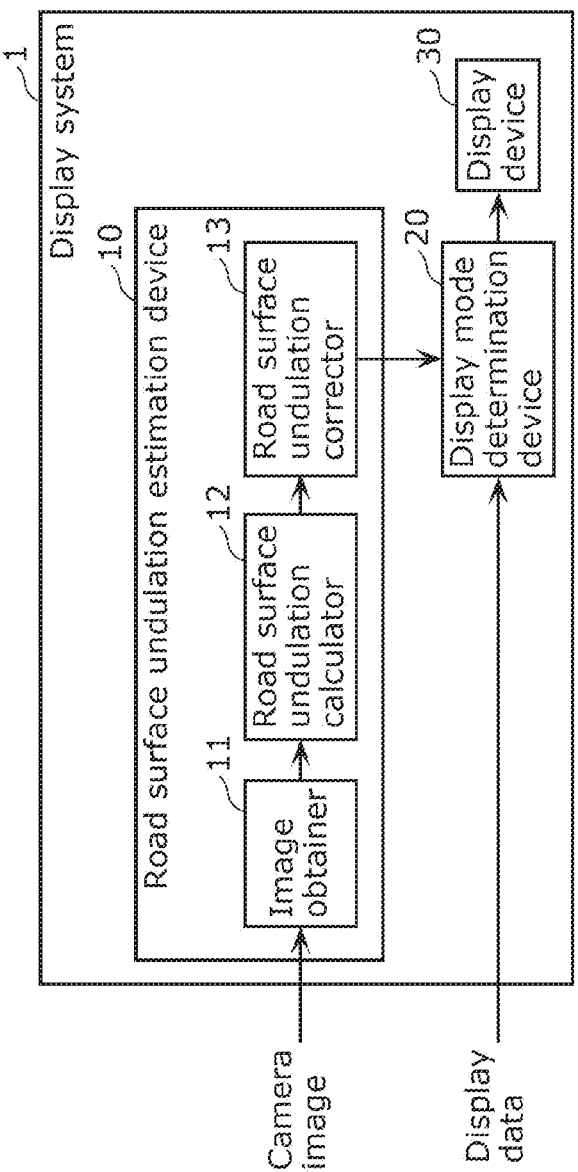
FIG. 1 is a block diagram illustrating the functional configuration of a display system according to an embodiment.

DESCRIPTION OF EMBODIMENT (Circumstances Leading to the Present Disclosure)

Before describing an embodiment of the present disclosure, circumstances leading to the present disclosure will be described.

As mentioned in Background, techniques have been proposed for estimating the undulation of a road surface ahead of a mobile body using camera-captured images of the surroundings of the vehicle. Such techniques may fail to accurately estimate the road surface undulation, due to noise in calculating three-dimensional positions. This noise may result from poor image quality (such as a poor resolution or contrast) or dynamic variations in the attitude of the moving vehicle (e.g., due to vehicle vibrations, lane changes, or steering wheel operations). To display content superimposed at an appropriate position, however, more accurate estimation of the road surface undulation is desired. Unfortunately, PTLs 1 and 2 do not disclose techniques of estimating the road surface undulation from images by taking into account the image quality and noise.

By careful study on display systems and other implementations capable of accurately estimating the road surface undulation from images irrespective of poor image quality or noise, the inventors of the present application have devised a display system and other implementations as described below.

In accordance with an aspect of the present disclosure, a display system includes: a road surface undulation estimator that estimates undulation of a road surface; a superimposing position determiner that determines, based on the undulation estimated by the road surface undulation estimator, a superimposing position at which a content is to be displayed by being superimposed on a foreground; and a display that displays the content with the content being superimposed on the foreground, at the superimposing position determined by the superimposing position determiner, wherein the road surface undulation estimator includes: a road surface undulation information obtainer that obtains a plurality of road surface undulation information items indicating the undulation of the road surface at a plurality of points, the road surface undulation information items being calculated based on a plurality of images generated when an imager provided to a mobile body performs image capturing a plurality of times; a determiner that determines whether or not each of the plurality of road surface undulation information items obtained by the road surface undulation information obtainer satisfies a predetermined condition; and an estimator that estimates the undulation of the road surface based on one or more road surface undulation information items which are determined by the determiner to satisfy the predetermined condition among the plurality of road surface undulation information items.

Thus, the undulation of the road surface is estimated based on one or more road surface undulation information items that satisfy the predetermined condition. This enables excluding road surface undulation information items for which three-dimensional restoration processing for estimating road surface undulation information from images has failed due to, for example, the image quality or noise effects. That is, road surface undulation information items that would reduce the accuracy of estimating the undulation of the road surface can be excluded. The display system can therefore more accurately estimate the undulation of the road surface. This leads to preventing the display system from displaying the content misaligned with the superimposing position, and thus preventing a user from erroneously recognizing information or having an odd feeling when looking at the content.

For example, it is possible that each of the plurality of road surface undulation information items includes a relative position of an object with respect to the mobile body, the object being within a capturing range of the imager, and that the predetermined condition is a condition that the relative position is within a predetermined threshold range.

Thus, the undulation of the road surface can be estimated by excluding relative positions outside the predetermined threshold range. This enables more accurate estimation of the undulation of the road surface.

For example, it is possible that the predetermined condition is a condition that a total number of the plurality of road surface undulation information items is greater than or equal to a predetermined number.

Thus, the undulation of the road surface can be estimated using road surface undulation information items not fewer than the predetermined number. This enables more accurate estimation of the undulation of the road surface than using fewer road surface undulation information items.

For example, it is possible that each of the plurality of road surface undulation information items includes a relative position of an object with respect to the mobile body, the object being within a capturing range of the imager, that the relative position includes a position in a width direction along a width of a lane on which the mobile body travels, with respect to a current position of the mobile body in the width direction, that the determiner (i) determines whether a total number of relative positions included in the plurality of road surface undulation information items is greater than or equal to a predetermined number, and (ii) when the determiner determines that the total number is not greater than or equal to the predetermined number, determines whether or not each of the relative positions is within a predetermined threshold range, and that the estimator estimates the undulation of the road surface based on (i) one or more first relative positions being within the predetermined threshold range among the relative positions and (ii) one or more processed second relative positions obtained by performing predetermined processing on one or more second relative positions being outside the predetermined threshold range among the relative positions.

Thus, if the number data items of relative positions for estimating the undulation of the road surface is insufficient, data items of relative positions outside the predetermined threshold range can be used to increase the number of data items of relative positions for estimating the undulation of the road surface. This enables more accurate estimation of the undulation of the road surface.

For example, it is possible that the predetermined processing is processing of offsetting each of the one or more second relative positions by a predetermined reduction amount.

An object located higher than and in parallel to the road, such as a guardrail, may have relative positions outside the predetermined threshold range. In the above manner, target positions of such an object can be used as relative positions for estimating the undulation of the road surface.

For example, it is possible that each of the plurality of road surface undulation information items includes a relative position of an object with respect to the mobile body, the object being within a capturing range of the imager, and that the predetermined condition is a condition that a change amount between relative positions included in the plurality of road surface undulation information items is within a predetermined threshold range.

Thus, the undulation of the road surface can be estimated by excluding relative positions having a change amount outside the predetermined threshold range. This enables more accurate estimation of the undulation of the road surface.

For example, it is possible that the determiner calculates, for each of three or more sequential relative positions included in the relative positions, a change amount from each of other two or more relative positions among the three or more sequential relative positions, and that the predetermined condition further includes a condition that a total number of times when the change amount is outside the predetermined threshold range is smaller than a predetermined number. For example, it is possible that the determiner calculates a first approximation curve based on the relative positions, and that the predetermined condition is a condition that a change amount of each of the relative positions from the first approximation curve is within the predetermined threshold range.

A relative position significantly different from neighboring relative positions may indicate low accuracy of the three-dimensional restoration processing. Excluding such relative positions in the above manner can improve the accuracy of estimating the undulation of the road surface.

For example, it is possible that each of the plurality of road surface undulation information items includes a relative position of an object with respect to the mobile body, the object being within a capturing range of the imager, and that the predetermined condition is a condition that the relative positions to be used in the estimating of the undulation of the road surface are positions obtained by performing smoothing based on (i) first relative positions being the relative positions obtained at a current time and (ii) second relative positions being the relative positions estimated in past.

Thus, the current and past relative positions at each point are smoothed. If either one of the relative positions is low-accuracy data, the effect of the low accuracy can be reduced by smoothing. This enables more accurate estimation of the undulation of the road surface.

For example, it is possible that the second relative positions have been estimated at a first time point in past, and that the predetermined condition is a condition that the relative positions to be used in the estimating of the undulation of the road surface are positions obtained by performing smoothing based on the first relative positions, the second relative positions, and third relative positions being the relative positions estimated at a second time point in past.

Thus, the smoothing effect can be improved by using the relative positions at the multiple time points in the past. This enables further accurate estimation of the undulation of the road surface.

For example, it is possible that each of the plurality of road surface undulation information items includes a relative position of an object with respect to the mobile body, the object being within a capturing range of the imager, and that the predetermined condition is a condition that a difference between first relative positions and second relative positions is within a predetermined threshold range, the first relative positions being relative positions included in the plurality of road surface undulation information items and being obtained at a current time, the second relative positions being relative positions included in the plurality of road surface undulation information items and having been estimated in past.

Thus, the undulation of the road surface can be estimated by excluding relative positions such that the difference between current and past relative positions is outside the predetermined threshold range. This enables more accurate estimation of the undulation of the road surface.

For example, it is possible that the relative position includes a position in a height direction along a height of the mobile body with respect to a current position of the mobile body in the height direction, and that the predetermined threshold range is determined based on an acceptable road gradient.

Thus, road surface undulation information items unrealistic from the perspective of road structure can be excluded. This enables more accurate estimation of the undulation of the road surface.

For example, it is possible that the relative position includes a position in a width direction along a width of a lane on which the mobile body travels with respect to a current position of the mobile body in the width direction, and that the predetermined threshold range is determined based on the width of the lane.

Thus, information indicating the undulation of objects outside the lane on which the mobile body travels can be excluded. This enables more accurate estimation of undulation in the width direction.

For example, it is possible that the relative position includes a position in a moving direction of the mobile body with respect to a current position of the mobile body in the moving direction, and that the predetermined threshold range is determined based on performance of the imager.

Thus, road surface undulation information items that are in a range where the imager performance is low or are outside the operation range of the imager can be excluded. This enables more accurate estimation of the undulation of the road surface.

In accordance with another aspect of the present disclosure, a road surface undulation estimation device includes: a road surface undulation information obtainer that obtains a plurality of road surface undulation information items indicating the undulation of the road surface at a plurality of points, the road surface undulation information items being calculated based on a plurality of images generated when an imager provided to a mobile body performs image capturing a plurality of times; a determiner that determines whether or not each of the plurality of road surface undulation information items obtained by the road surface undulation information obtainer satisfies a predetermined condition; and an estimator that estimates the undulation of the road surface based on one or more road surface undulation information items which are determined by the determiner to satisfy the predetermined condition among the plurality of road surface undulation information items. In accordance with still another aspect of the present disclosure, a display method includes: obtaining a plurality of road surface undulation information items indicating the undulation of the road surface at a plurality of points, the road surface undulation information items being calculated based on a plurality of images generated when an imager provided to a mobile body performs image capturing a plurality of times; determining whether or not each of the plurality of road surface undulation information items obtained in the obtaining satisfies a predetermined condition; estimating the undulation of the road surface based on one or more road surface undulation information items which are determined in the determining to satisfy the predetermined condition among the plurality of road surface undulation information items; determining that determines, based on the undulation estimated, a superimposing position at which a content is to be displayed by being superimposed on a foreground; and displaying the content with the content being superimposed on the foreground, at the superimposing position determined.

The above provides the same advantageous effects as the foregoing display system.

General or specific aspects of the present disclosure may be implemented to a system, a device, a method, an integrated circuit, a computer program, a non-transitory computer-readable recording medium such as a Compact Disc-Read Only Memory (CD-ROM), or any given combination thereof. The program may be stored in the recording medium, or provided to the recording medium via a wide area network such as the Internet.

Hereinafter, certain exemplary embodiments will be described in detail with reference to the accompanying Drawings.

The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Note that the respective figures are schematic diagrams and are not necessarily precise illustrations. Therefore, the scales or the like applied in the figures are not necessarily unified. Additionally, components that are essentially the same share like reference signs in the figures. Accordingly, overlapping explanations thereof are omitted or simplified.

As used herein, terms indicating relationships between elements, such as "same," "parallel," and "vertical," as well as numerical values and ranges of numerical values are expressions not only conveying their exact meanings but covering substantially equivalent ranges, for example differences of the order of several percent (or 10%).

Unless otherwise specified, ordinal numbers such as "first" and "second" as used herein do not mean the number of or order of components but are used for the purpose of distinction among similar components to avoid confusion.

Embodiment

A display system according to an embodiment will be described below with reference to FIGS. 1 to 11.

[1. Configuration of Display System]

First, the configuration of a display system according to the embodiment will be described with reference to FIG. 1. FIG. 1 is a block diagram illustrating the functional configuration of display system 1 according to the embodiment.

Figures 4A, 4B:
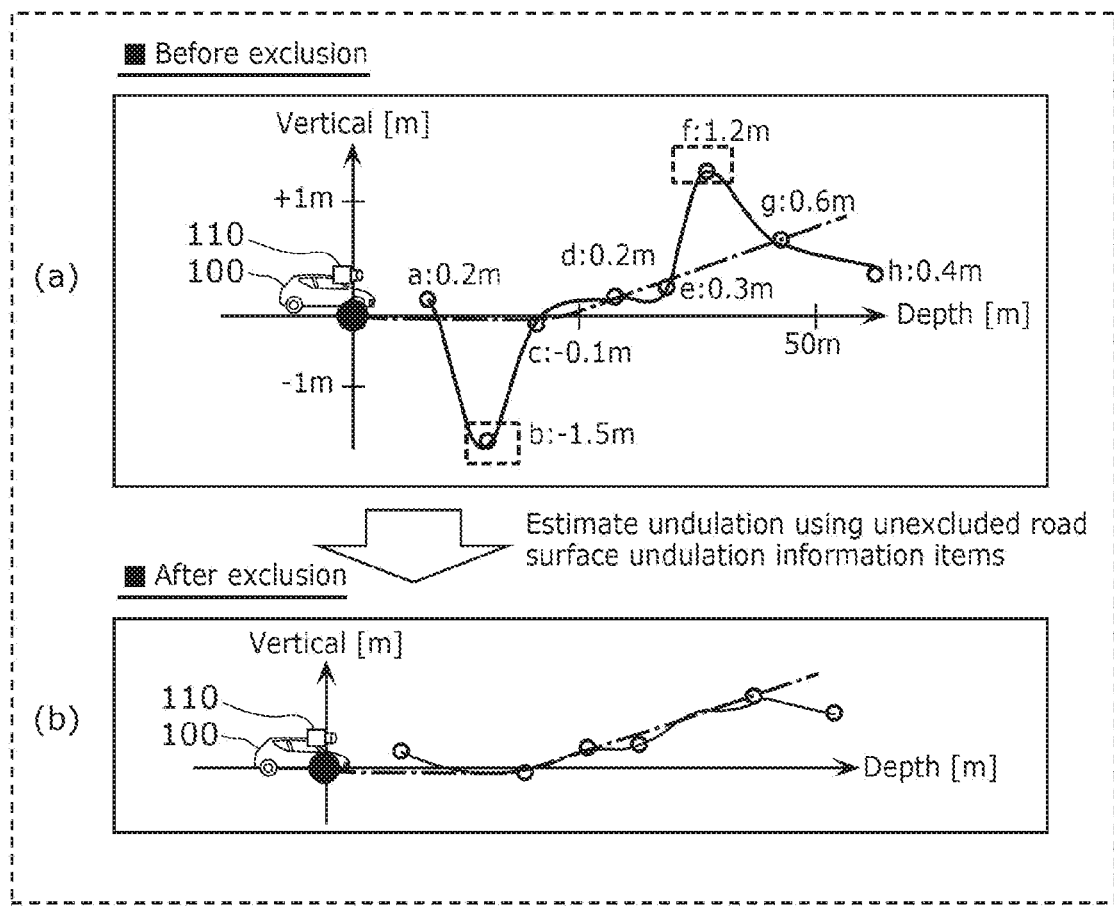
FIG. 4A is a first diagram for describing a third condition according to the embodiment.
FIG. 4B is a second diagram for describing the third condition according to the embodiment.

As illustrated in FIG. 1, display system 1 displays content (e.g., graphics) superimposed at a superimposing position on the foreground in front of a mobile body (e.g., mobile body 100 illustrated in figures such as FIG. 4A). The superimposing position is determined based on images captured by an imager (e.g., imager 110 illustrated in figures such as FIG. 4A) provided on the mobile body. For example, mobile body 100 may be a vehicle capable of traveling with an occupant therein and may display, to the occupant of mobile body 100, content superimposed on an object ahead. For example, mobile body 100 may be a vehicle, and the object may be a preceding vehicle, a pedestrian, a road surface, or a traffic sign. Display system 1 includes road surface undulation estimation device 10, display mode determination device 20, and display device 30.

Road surface undulation estimation device 10 estimates the undulation of a road surface ahead of mobile body 100 based on images generated by capturing the area ahead of mobile body 100. Road surface undulation estimation device 10 includes image obtainer 11, road surface undulation calculator 12, and road surface undulation corrector 13. Road surface undulation estimation device 10 is an example of a road surface undulation estimator.

Image obtainer 11 obtains images captured by imager 110, which is provided on mobile body 100 to perform image capturing multiple times. For example, image obtainer 11 obtains the images by receiving an image each time imager 110 captures the image. Imager 110 is, for example, provided on mobile body 100 so that the area ahead of mobile body 100 is captured, and captures the area ahead of mobile body 100 multiple times. For example, imager 110 repeatedly performs image capturing at predetermined time intervals, and the resulting images indicate the situation ahead of mobile body 100 at the predetermined time intervals. As an example, imager 110 can capture a range wider than or equal to the width of the lane on which mobile body 100 travels. As another example, imager 110 can capture a predetermined range (e.g., from 5 to 50 m) ahead of mobile body 100. Imager 110 may be a device such as a camera or a LIDAR, for example.

Road surface undulation calculator 12 obtains road surface undulation information by calculating, based on the images, road surface undulation information items indicating the road surface undulation at respective points in the area ahead. In other words, road surface undulation calculator 12 estimates the road surface undulation information items based on the images. Road surface undulation calculator 12 calculates, based on the images, the road surface undulation information items that include the relative positions of the road surface undulation with respect to the current mobile body position. The road surface undulation information items also include the relative positions of objects (objects other than the road surface) in the capturing range of imager 110, with respect to mobile body 100. Calculating the road surface undulation information items based on the images will also be referred to as three-dimensional restoration processing.

The three-dimensional restoration processing by road surface undulation calculator 12 may be performed in any known manner. For example, a manner disclosed in PTL 1 may be used. Road surface undulation calculator 12 is an example of a road surface undulation information obtainer.

Figure 2A:
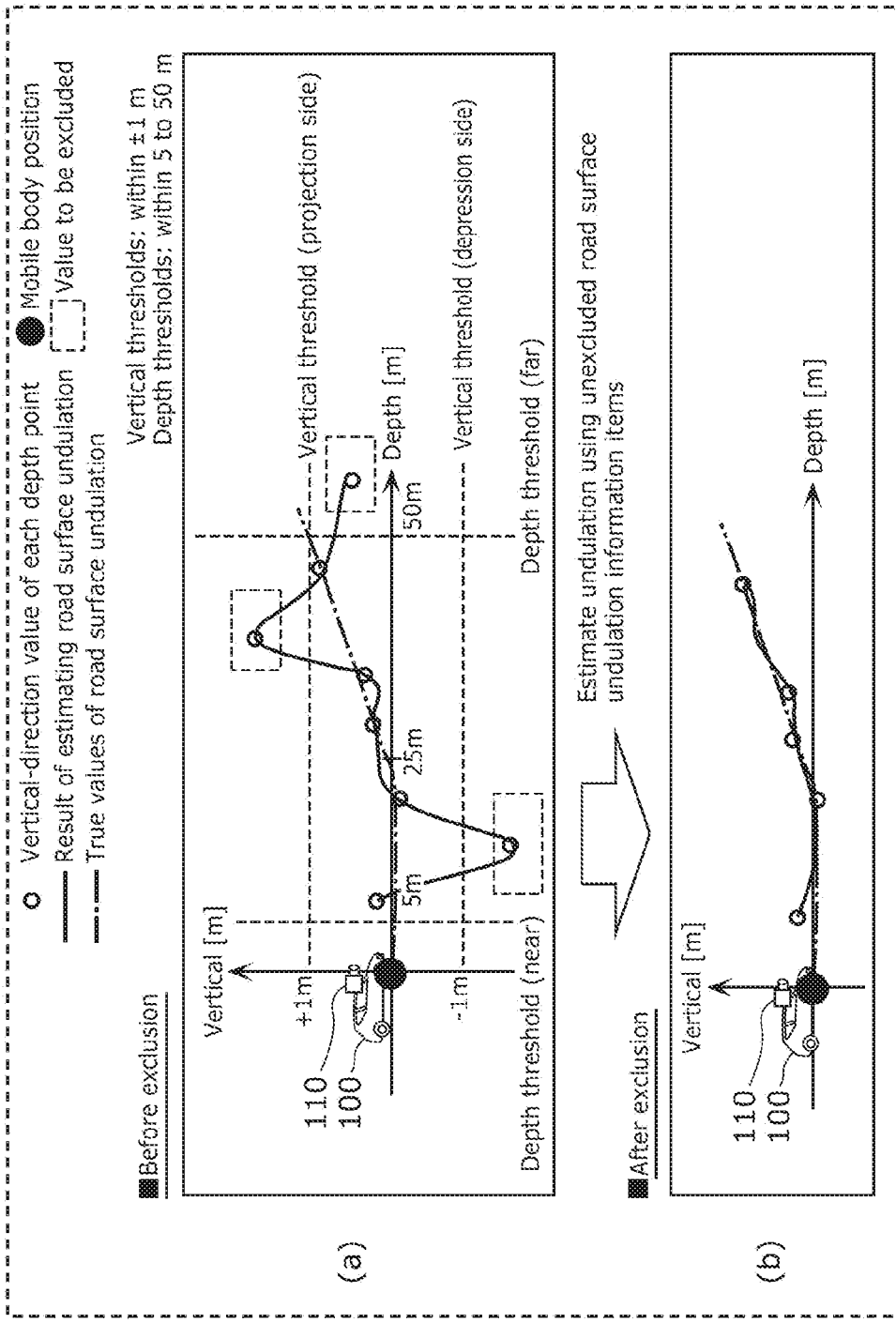
FIG. 2A is a first diagram for describing a first condition according to the embodiment.

The road surface undulation information items will be described here with reference to FIG. 2A. FIG. 2A is a first diagram for describing a first condition according to the embodiment.

(a) in FIG. 2A is a diagram illustrating road surface undulation estimated by road surface undulation calculator 12. In (a) in FIG. 2A, the abscissa indicates the forward position (Depth) with respect to the current position of mobile body 100, and the ordinate indicates the position in the height direction (Vertical) with respect to the current position of mobile body 100. (a) in FIG. 2A illustrates the result of estimation before road surface undulation corrector 13 excludes road surface undulation information items that do not satisfy a predetermined condition.

Open circles in (a) in FIG. 2A, which are an example of road surface undulation information items (specifically, relative positions), represent all of the vertical-direction values (the relative heights) of respective depth points calculated by road surface undulation calculator 12. A solid line represents the result of estimating the road surface undulation using all the vertical-direction values of the respective depths points. A dashed and single-dotted line represents the true values of the road surface undulation (the real road surface undulation). A filled circle represents the current position of mobile body 100 (the mobile body position). Dashed-line frames indicate road surface undulation information items determined not to satisfy the predetermined condition and excluded by road surface undulation corrector 13.

Road surface undulation calculator 12 thus calculates the road surface undulation at each point ahead of mobile body 100.

Road surface undulation corrector 13 corrects the road surface undulation calculated by road surface undulation calculator 12. Road surface undulation corrector 13 determines whether each road surface undulation information item calculated by road surface undulation calculator 12 satisfies the predetermined condition. Road surface undulation corrector 13 functions as a determiner. Road surface undulation corrector 13 also estimates the road surface undulation based on one or more road surface undulation information items determined to satisfy the predetermined condition. Road surface undulation corrector 13 also functions as an estimator.

Thus, road surface undulation estimation device 10 according to the embodiment estimates the road surface undulation using road surface undulation information items that satisfy the predetermined condition, rather than using all the items.

Figure 2B:
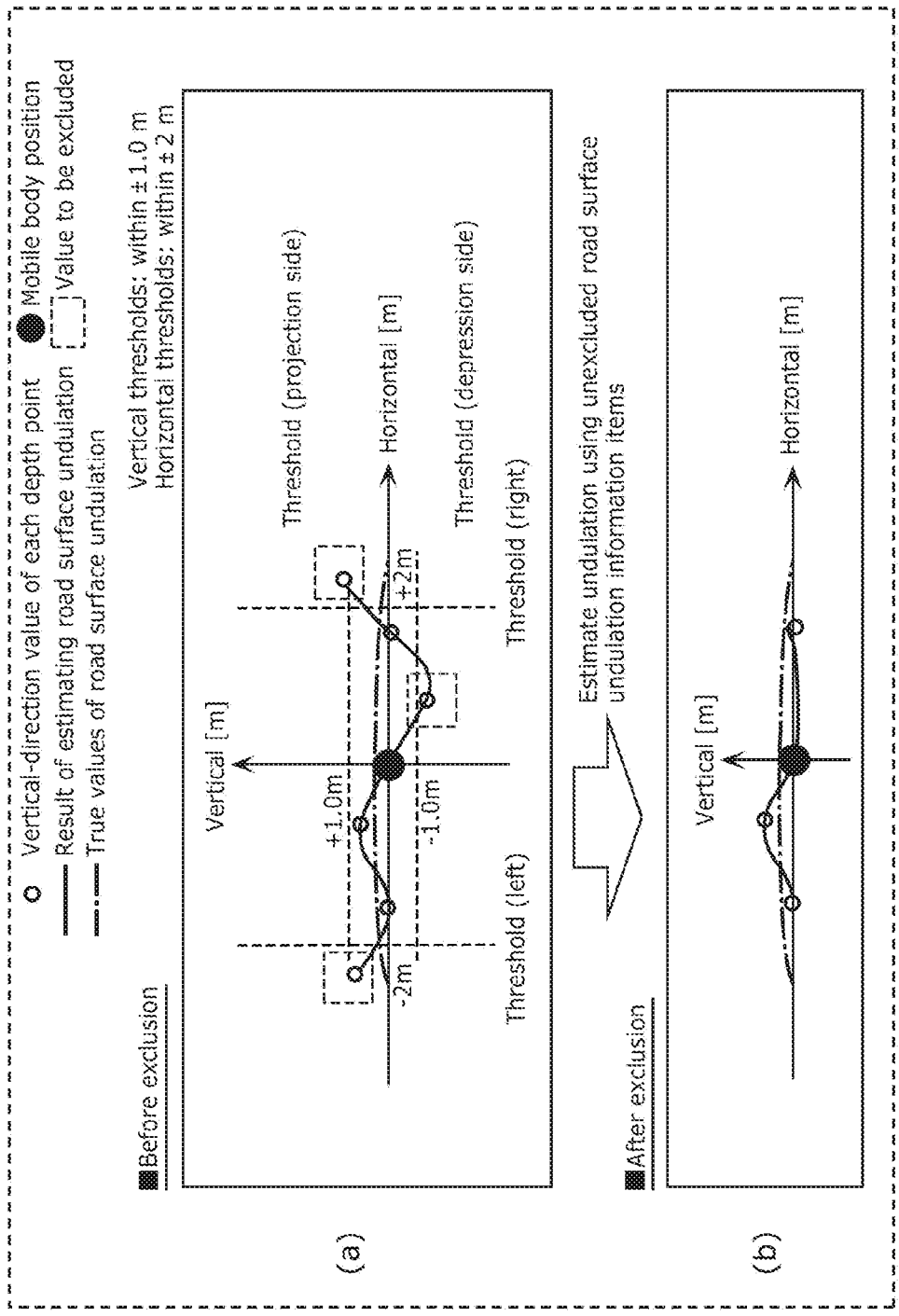
FIG. 2B is a second diagram for describing the first condition according to the embodiment.

The predetermined condition will be described here with reference to FIGS. 2A to 9. First, with reference to FIGS. 2A and 2B, the following describes a case in which the predetermined condition is that the relative positions of the road surface undulation with respect to the mobile body position are within a predetermined threshold range. FIG. 2B is a second diagram for describing the first condition according to the embodiment.

Each relative position includes three positions: positions in the vertical direction, depth direction, and horizontal direction. Thresholds in the vertical direction (vertical thresholds) and thresholds in the depth direction (depth thresholds) will be described with reference to FIG. 2A. Thresholds in the horizontal direction (horizontal thresholds) will be described with reference to FIG. 2B. The vertical, depth, and horizontal thresholds are preset and stored in storage (not shown). Although the example to be described below uses road surface undulation information items that satisfy all the three threshold ranges, items that satisfy at least one threshold range may be used to estimate the road surface undulation. The horizontal direction is the direction along the width of the road on which mobile body 100 travels, and the depth direction is, for example, the moving direction of mobile body 100.

Road surface undulation corrector 13 excludes, among the road surface undulation information items at the respective points calculated by road surface undulation calculator 12, items outside the predetermined threshold ranges. Based on one or more unexcluded road surface undulation information items, road surface undulation corrector 13 estimates the road surface undulation. In this manner, the road surface undulation information items that satisfy the predetermined condition are used to redo the estimation of the road surface undulation, and this will also be referred to herein as correction.

The vertical thresholds are set based on an acceptable road gradient from the perspective of road structure, and are ±1 m in the example in FIG. 2A. The depth thresholds are set based on the performance of imager 110, and are not smaller than 5 m and not greater than 50 m (within the range from 5 to 50 m) in the example in FIG. 2A. Road surface undulation corrector 13 excludes, from the road surface undulation information items, items that are outside ±1 m in the vertical direction and are smaller than 5 m or greater than 50 m in the depth direction. It is to be noted that the vertical and depth thresholds may be other values.

(b) in FIG. 2A illustrates road surface undulation estimated by excluding the three road surface undulation information items surrounded by the dashed-line frames in (a) in FIG. 2A. It can be seen that the road surface undulation closer to the true values of the road surface undulation than in (a) in FIG. 2A is estimated.

FIG. 2B is a diagram of the area ahead viewed from mobile body 100. The horizontal thresholds are set based on the width of the road on which mobile body 100 travels, and are ±2 m in the example in FIG. 2B. The horizontal thresholds may be set dynamically based on the current position of mobile body 100 and map information, or may be fixed values. It is to be noted that the horizontal thresholds may be other values.

(a) in FIG. 2B illustrates the result of estimation before road surface undulation corrector 13 excludes road surface undulation information items that do not satisfy the predetermined condition. (b) in FIG. 2B illustrates the result of estimation after road surface undulation corrector 13 excludes the road surface undulation information items that do not satisfy the predetermined condition.

As illustrated in (a) in FIG. 2B, road surface undulation corrector 13 excludes, from the road surface undulation information items, items outside ±2 m in the horizontal direction (e.g., items outside ±1 m in the vertical direction and outside ±2 m in the horizontal direction).

(b) in FIG. 2B illustrates road surface undulation estimated by excluding three road surface undulation information items surrounded by dashed-line frames in (a) in FIG. 2B. It can be seen that the road surface undulation closer to the true values than in (a) in FIG. 2B is estimated.

Thus, road surface undulation estimation device 10 excludes road surface undulation information items for which the three-dimensional restoration processing has failed (e.g., items including noise). This enables more accurate estimation of the road surface undulation.

Figure 3A:
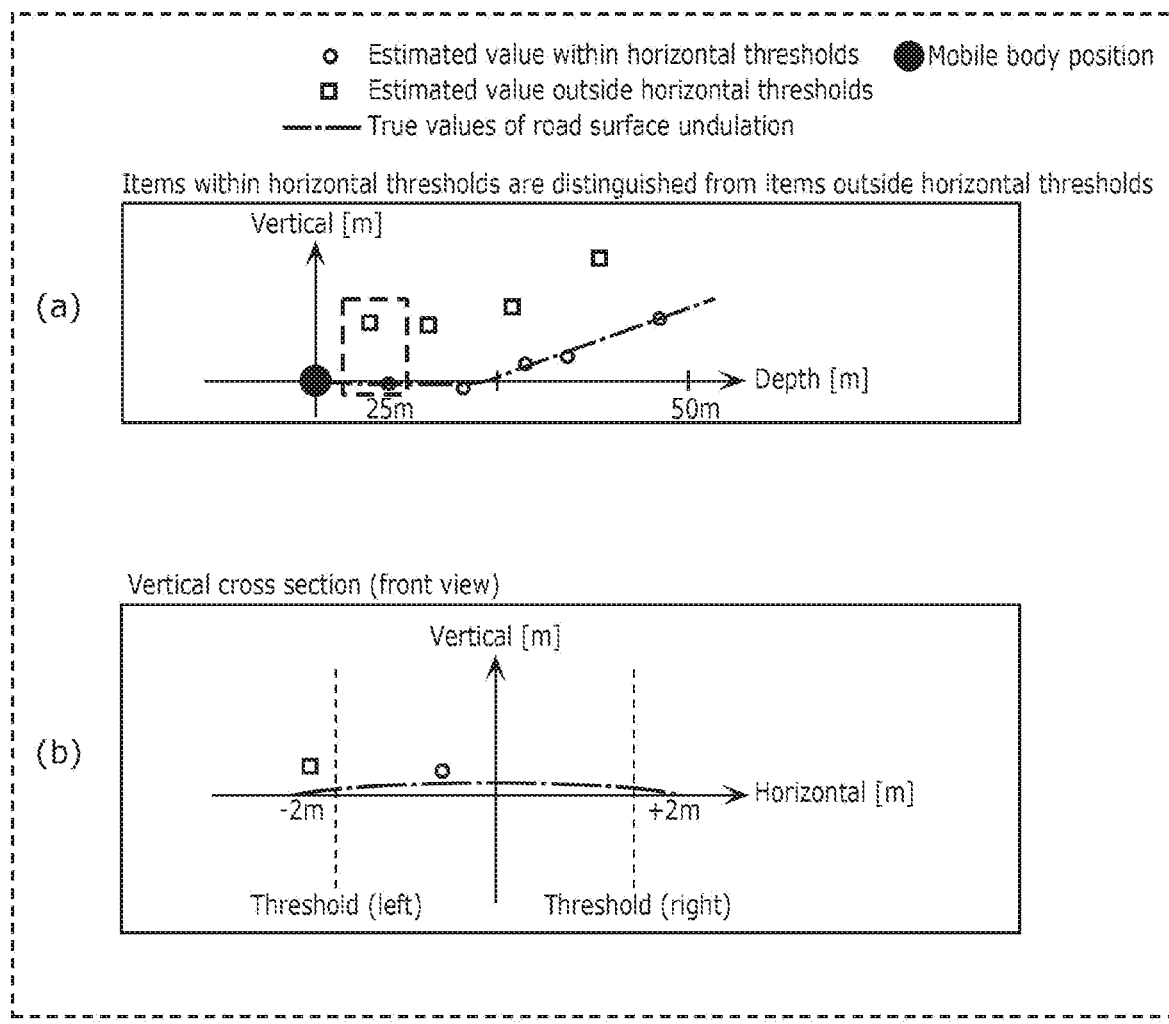
FIG. 3A is a first diagram for describing a second condition according to the embodiment.
Figure 3B:
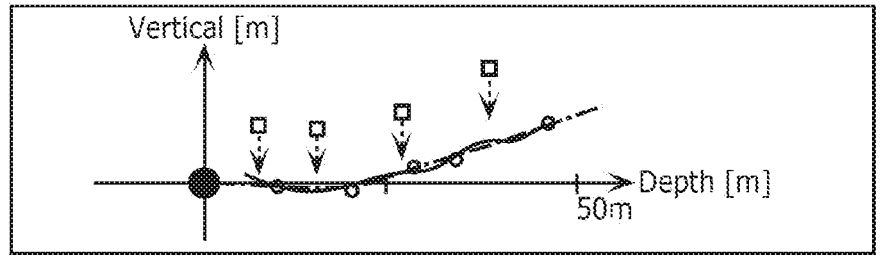
FIG. 3B is a second diagram for describing the second condition according to the embodiment.
Figure 3B:
Figure 3B:
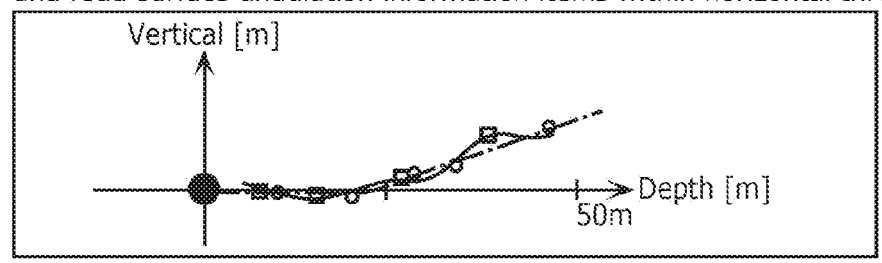

Next, with reference to FIGS. 3A and 3B, the following describes a case in which the predetermined condition is that the total number of road surface undulation information items is greater than or equal to a predetermined number. FIG. 3A is a first diagram for describing a second condition according to the embodiment. FIG. 3B is a second diagram for describing the second condition according to the embodiment. FIG. 3A illustrates road surface undulation information items estimated by road surface undulation calculator 12, and FIG. 3B illustrates processing performed by road surface undulation corrector 13.

The number of road surface undulation information items being greater than or equal to a predetermined number may mean that the number of road surface undulation information items estimated by road surface undulation calculator 12 (the number of road surface undulation information items before excluding items) is greater than or equal to the predetermined number, or may mean that the number of one or more road surface undulation information items remaining after excluding items in FIGS. 2A and 2B (the number of road surface undulation information items after excluding items) is greater than or equal to the predetermined number. The following description adopts the latter meaning, i.e., that the number of one or more road surface undulation information items remaining after excluding items in FIGS. 2A and 2B (the number of road surface undulation information items after excluding items) is greater than or equal to the predetermined number.

(a) in FIG. 3A is a diagram illustrating road surface undulation information items estimated by road surface undulation calculator 12, in which the items within the horizontal thresholds are distinguished from the items outside the horizontal thresholds. (b) in FIG. 3A is a diagram of the area ahead viewed from mobile body 100.

As illustrated in (a) and (b) in FIG. 3A, road surface undulation corrector 13 determines whether the road surface undulation information items estimated by road surface undulation calculator 12 satisfy the horizontal thresholds. In the example in (a) in FIG. 3A, open circles represent the road surface undulation information items within the horizontal thresholds, and open squares represent the road surface undulation information items outside the horizontal thresholds. It is to be noted that road surface undulation information items outside the horizontal thresholds may be items having horizontal positions within a predetermined range (e.g., the range from 2 to 2.5 m) and horizontally close to each other. The horizontal thresholds are an example of a predetermined threshold range.

Road surface undulation corrector 13 determines whether the number of road surface undulation information items satisfying the horizontal thresholds is greater than or equal to the predetermined number. If not, road surface undulation corrector 13 performs the following processing.

(a) in FIG. 3B is a diagram for describing offsetting the road surface undulation information items outside the horizontal thresholds by a predetermined value. (b) in FIG. 3B illustrates the result of estimating the road surface undulation from both the offset road surface undulation information items and the road surface undulation information items within the horizontal thresholds.

Road surface undulation information items outside the horizontal thresholds may represent, rather than the road surface, a structure disposed outside the road in parallel to the road (provided along the road surface undulation), such as a guardrail or a noise-blocking wall. For example, road surface undulation information items outside the horizontal thresholds may indicate undulation similar to the road surface undulation. Therefore, if the number of road surface undulation information items satisfying the horizontal thresholds is determined to be smaller than the predetermined number, road surface undulation corrector 13 uses items outside the horizontal thresholds as well to estimate the road surface undulation. In other words, road surface undulation information items outside the horizontal thresholds once eliminated are recovered.

As illustrated in (a) in FIG. 3B, road surface undulation corrector 13 offsets the road surface undulation information items outside the horizontal thresholds by a predetermined value (see downward arrows in (a) in FIG. 3B). Offsetting here is processing of offsetting one or more road surface undulation information items (e.g., relative positions) by a predetermined value (a predetermined reduction amount). That is, offsetting is processing of reducing, for example uniformly, vertical-direction values.

The predetermined value may be, for example, the difference in the vertical direction between the road surface undulation information item at the position closest to mobile body 100 among the items outside the horizontal thresholds and the result (a solid line) of estimating the road surface undulation. Alternatively, the predetermined value may be preset for each structure type and stored in storage, or may be a fixed value. The structure type may be obtained by analyzing images captured by imager 110. (a) in FIG. 3B illustrates an example in which the offset value is 1 m. Offsetting is an example of predetermined processing.

As illustrated in (b) in FIG. 3B, road surface undulation corrector 13 estimates the road surface undulation from the road surface undulation information items within the horizontal thresholds, as well as the offset road surface undulation information items outside the horizontal thresholds. In other words, road surface undulation corrector 13 estimates the road surface undulation based on one or more first relative positions within the predetermined threshold range, and one or more processed second relative positions obtained by offsetting one or more second relative positions outside the predetermined threshold range.

Alternatively, road surface undulation corrector 13 may determine whether the shape of the road surface undulation estimated from the road surface undulation information items outside the horizontal threshold is similar (e.g., similar within a predetermined range) to the shape of the road surface undulation estimated from the road surface undulation information items within the horizontal threshold. If so, road surface undulation corrector 13 may determine to estimate the road surface undulation from both the road surface undulation information items within the horizontal thresholds and the offset road surface undulation information items outside the horizontal thresholds.

Next, with reference to FIGS. 4A and 4B, the following describes a case in which the predetermined condition is that the change amount between relative positions of road surface undulation at points with respect to the mobile body position is within a predetermined threshold range. FIG. 4A is a first diagram for describing a third condition according to the embodiment. FIG. 4B is a second diagram for describing the third condition according to the embodiment. FIG. 4A illustrates the results of estimating the road surface undulation before and after excluding items, and FIG. 4B illustrates an example of the result of determining a point to be excluded. Although each relative position includes three positions in the vertical, depth, and horizontal directions, the following description focuses on the relative position in the vertical direction.

(a) in FIG. 4A illustrates an example in which road surface undulation calculator 12 estimates the vertical values (the relative heights) of eight points a to h. Road surface undulation corrector 13 then determines whether the vertical differences (the differences in the height of the road surface) between three adjacent points exceed a threshold and, based on the determination, determines points to be excluded.

As illustrated in FIG. 4B, for each of three or more sequential relative positions (e.g., the relative positions at points a, b, and c), road surface undulation corrector 13 calculates the change amount between the relative position (e.g., the relative position at point a) and each of the other two or more relative positions (e.g., the relative positions at points b and c). For example, road surface undulation corrector 13 may determine to exclude, among adjacent three points, a point such that the number of times the vertical difference of the point from each of the other two points is determined to exceed the threshold is relatively greater. FIG. 4B assumes the threshold as 0.5 m. For point a, the difference from point b exceeds the threshold. For point b, the differences from points a and c exceed the threshold. For point c, the difference from point b exceeds the threshold. In this case, road surface undulation corrector 13 determines to exclude point b, which exceeds the threshold twice, i.e., more times than the other points. Depending on the number of points or other factors, a threshold for the number of times a point is determined to exceed the threshold may also be set. That is, the predetermined condition may further include a condition that the change amount is determined to exceed the predetermined threshold range fewer than a predetermined number of times.

As illustrated in (b) in FIG. 4A, road surface undulation corrector 13 estimates the road surface undulation using the road surface undulation information items other than the two points b and f.

Figure 5:
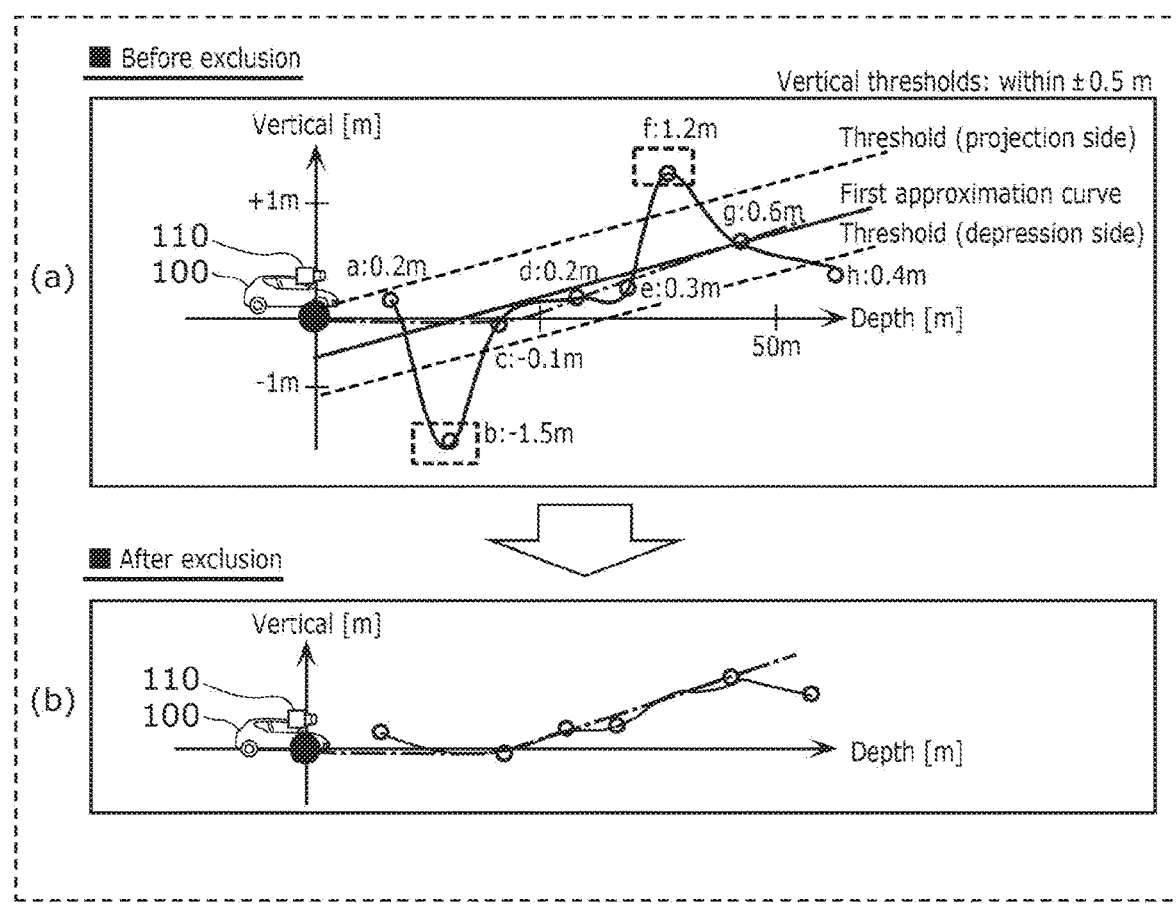
FIG. 5 is a diagram for describing a fourth condition according to the embodiment.

Next, with reference to FIG. 5, the following describes another example of the case in which the predetermined condition is that the change amount between relative positions of road surface undulation at points with respect to the mobile body position is within a predetermined threshold range. FIG. 5 is a diagram for describing a fourth condition according to the embodiment. FIG. 5 describes a case in which the predetermined condition is that the change amount from a first approximation curve calculated based on road surface undulation information items is within a predetermined threshold range. The road surface undulation information items here is the road surface undulation information items calculated by road surface undulation calculator 12 (the road surface undulation information items without excluding items or smoothing).

(a) in FIG. 5 illustrates an example in which a first approximation curve (a solid straight line) is calculated from the vertical values of eight points a to h estimated by road surface undulation calculator 12. Road surface undulation corrector 13 calculates the first approximation curve and determines whether to exclude a point based on whether the difference between the point and the first approximation curve calculated is within a predetermined threshold range. If it is determined that the difference is within the threshold range, road surface undulation corrector 13 determines to leave the vertical value of the point; otherwise, road surface undulation corrector 13 determines to exclude the vertical value of the point. The first approximation curve is calculated by road surface undulation corrector 13.

Road surface undulation corrector 13 determines to exclude a point such that the difference between the point and the first approximation curve is determined to be outside the thresholds.

As illustrated in (b) in FIG. 5, determining that points b and f are outside the thresholds based on the thresholding with reference to the first approximation curve, road surface undulation corrector 13 estimates the road surface undulation using the road surface undulation information items other than those at two points b and f. (b) in FIG. 5 assumes the thresholds as ±0.5 m.

Figure 6:
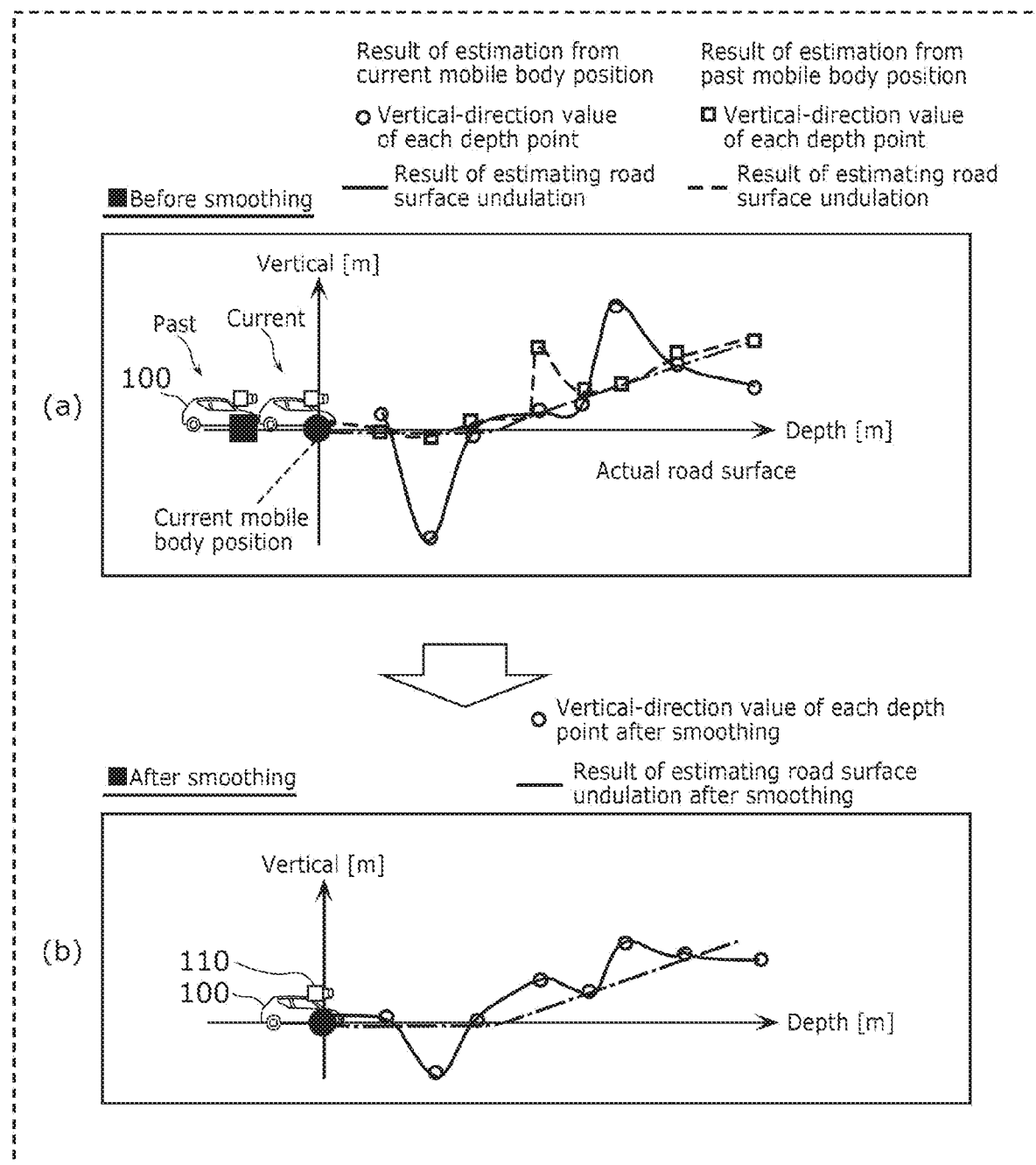
FIG. 6 is a diagram for describing a fifth condition according to the embodiment.
Figure 7:
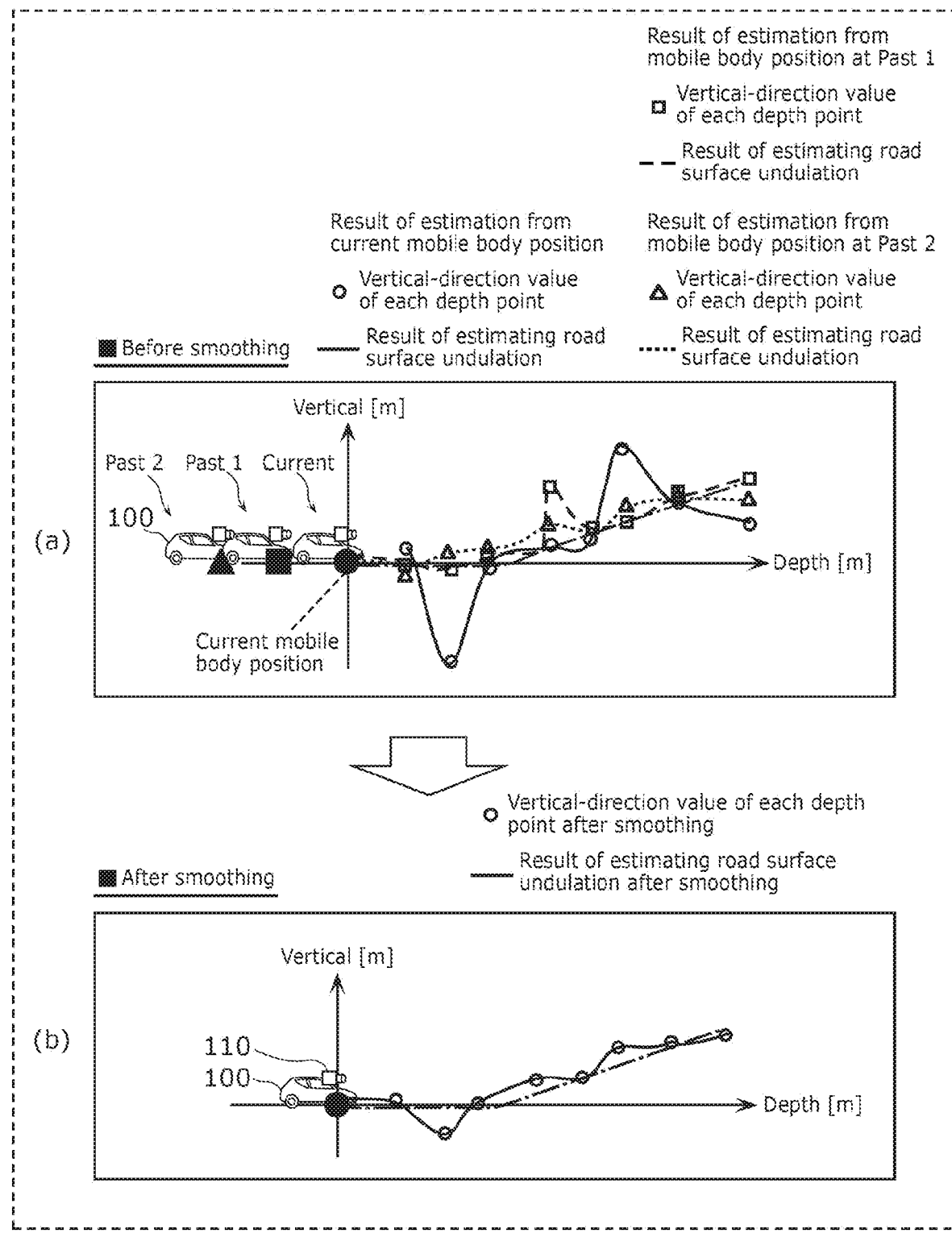
FIG. 7 is a diagram for describing a sixth condition according to the embodiment.

Next, with reference to FIGS. 6 and 7, the following describes cases in which the predetermined condition is that the relative positions to be used in estimating the road surface undulation are positions obtained by smoothing relative positions calculated at mutually corresponding points at the current time and one or more time points in the past. FIG. 6 is a diagram for describing a fifth condition according to the embodiment. FIG. 7 is a diagram for describing a sixth condition according to the embodiment. FIG. 6 illustrates an example of using a mobile body position at a single time point in the past, whereas FIG. 7 illustrates an example of using mobile body positions at multiple (two) time points in the past. Although FIGS. 6 and 7 describe estimating the road surface undulation in the vertical direction, the road surface undulation in the horizontal direction may be estimated in a similar manner.

(a) in FIG. 6 is a diagram illustrating road surface undulation information items at the current time and in the past. (b) in FIG. 6 is a diagram illustrating road surface undulation information items obtained by smoothing the road surface undulation information items at mutually corresponding points at the current time and in the past. In (a) in FIG. 6, a filled square represents the past position of mobile body 100, and open squares represent the past road surface undulation information items.

As illustrated in (a) and (b) in FIG. 6, road surface undulation corrector 13 smooths the road surface undulation information items estimated from the past position of mobile body 100 and the road surface undulation information items estimated from the current position of mobile body 100. In the embodiment, road surface undulation corrector 13 calculates the average of the relative positions at each pair of corresponding points at the current time and in the past. The average may be calculated by weighted averaging. It is to be noted that the corresponding points include points with identical depth and horizontal positions, as well as points closest to each other and points within a predetermined range from each other.

Road surface undulation corrector 13 determines that one or more smoothed items of the road surface undulation information items are road surface undulation information items that satisfy the predetermined condition.

(a) in FIG. 7 is a diagram illustrating road surface undulation information items at the current time and two time points in the past. (b) in FIG. 7 is a diagram illustrating road surface undulation information items obtained by smoothing the road surface undulation information items at mutually corresponding points at the current time and the two time points in the past. In (a) in FIG. 7, a filled square represents the position of mobile body 100 at a first time point in the past (Past 1), and open squares represent the road surface undulation information items at the first time point in the past. Also in (a) in FIG. 7, a filled triangle represents the position of mobile body 100 at a second time point in the past (Past 2), and open triangles represent the road surface undulation information items at the second time point in the past. The first and second time points in the past are different time points and may be temporally sequential.

As illustrated in (a) and (b) in FIG. 7, road surface undulation corrector 13 smooths the road surface undulation information items at the two time points in the past estimated from the respective positions of mobile body 100 at the two time points in the past, and the road surface undulation information items estimated from the current position of mobile body 100. In the embodiment, road surface undulation corrector 13 calculates the average of the relative positions at each set of corresponding points at the current time and the two time points in the past. The average may be calculated by weighted averaging.

More than two time points in the past may be referred to. The past road surface undulation information items used for the current road surface undulation information items are items obtained within 10 m behind the current position of mobile body 100, at the oldest.

Figure 8:
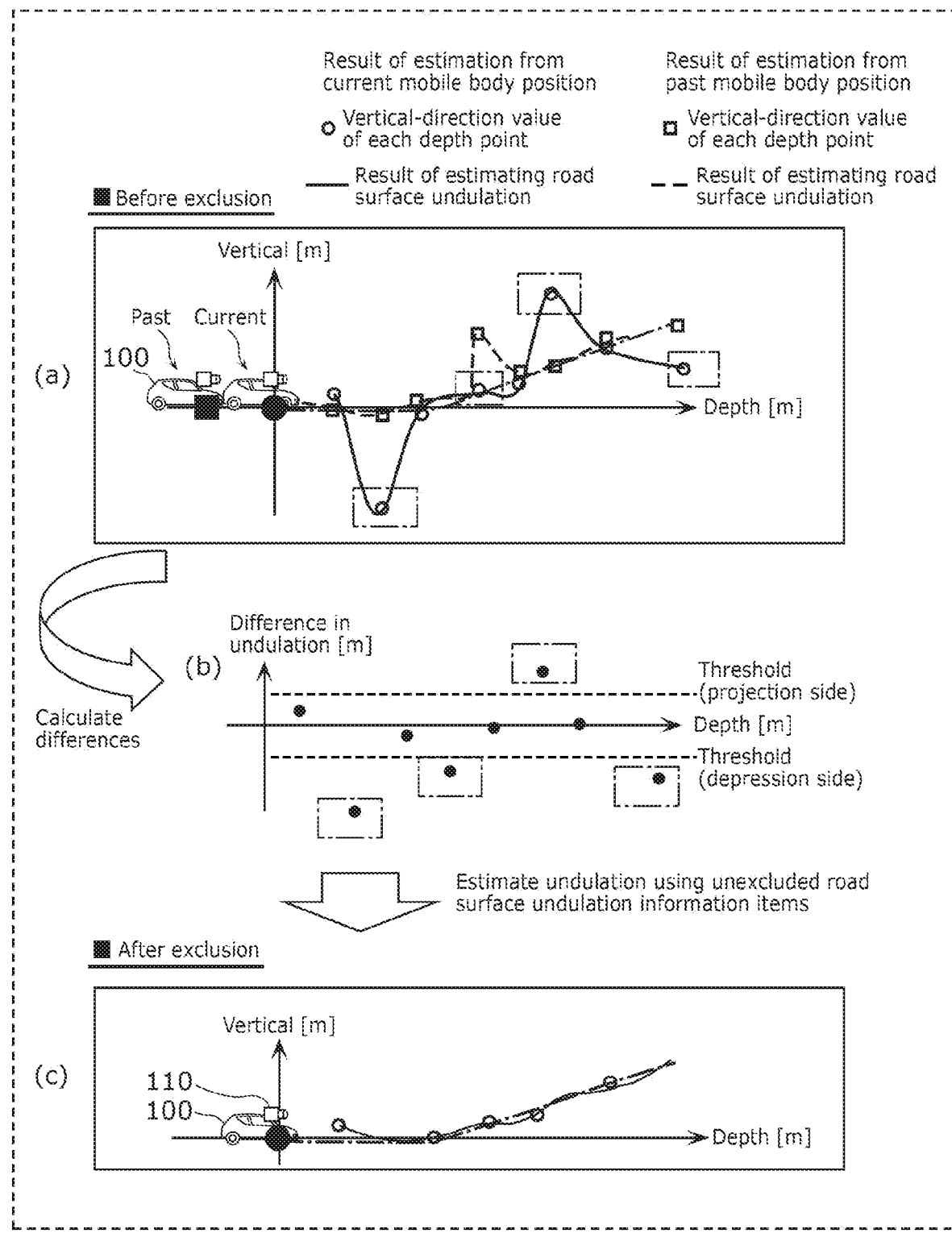
FIG. 8 is a diagram for describing a seventh condition according to the embodiment.

Next, with reference to FIG. 8, the following describes a case in which the predetermined condition is that the difference between road surface undulation estimated from a past mobile body position and road surface undulation estimated from the current position of mobile body 100 is within a predetermined threshold range. FIG. 8 is a diagram for describing a seventh condition according to the embodiment.

(a) in FIG. 8 is a diagram illustrating road surface undulation information items estimated at the current time and in the past.

(b) in FIG. 8 is a diagram illustrating the differences between the road surface undulation information items at mutually corresponding points estimated at the current time and in the past. (b) in FIG. 8 illustrates the result of subtracting the past road surface undulation information items from the current road surface undulation information items. Road surface undulation corrector 13 determines, for each pair of corresponding points, whether the difference in undulation is within a predetermined threshold range. If so, road surface undulation corrector 13 extracts the relevant road surface undulation information item. In the example in (b) in FIG. 8, four points are excluded as a result.

(c) in FIG. 8 illustrates the result of estimating the road surface undulation based on the road surface undulation information items extracted.

As described above, road surface undulation corrector 13 estimates the road surface undulation using at least one of the above conditions. For example, road surface undulation corrector 13 may estimate the road surface undulation using a combination of two or more of the conditions.

Referring again to FIG. 1, display mode determination device 20 determines, based on the undulation of the road surface ahead of mobile body 100 estimated by road surface undulation estimation device 10, a superimposing position at which content is to be displayed by being superimposed on the foreground as an exemplary display mode. For example, display mode determination device 20 obtains data on the content (display data for a head-up display (HUD)) from outside of display system 1 and determines the superimposing position of the content. For an uphill road ahead of mobile body 100, display mode determination device 20 causes the content to be displayed higher on display device 30 than for a flat road. For a downhill road ahead of mobile body 100, display mode determination device 20 causes the content to be displayed lower on display device 30 than for a flat road. Display mode determination device 20 is an example of a superimposing position determiner.

In addition to the superimposing position of the content, display mode determination device 20 may determine the shape or other characteristics of the content.

Display device 30 displays the content superimposed at the superimposing position determined by display mode determination device 20. Display device 30, which may be a head-up display provided in mobile body 100 for example, causes a user operating the vehicle, such as a driver, to visually recognize an image (e.g., visual information including numbers, text, and graphics such as an arrow). In particular, the head-up display projects an image onto a display medium, such as a windshield or a combiner provided in front of the cockpit of the vehicle. The windshield or the like then reflects the image, which is visually recognized by the user as a virtual image. Because the windshield or the combiner is light-transmissive, incident light from outside the vehicle is visually recognized by the user together with the virtual image as a view seen through the windshield or the combiner. Display device 30 thus displays the content superimposed on the foreground.

Display device 30 is not limited to a head-up display but may be, for example, augmented reality (AR) glasses worn by the user.

[2. Operations of Display System]

Figure 9:
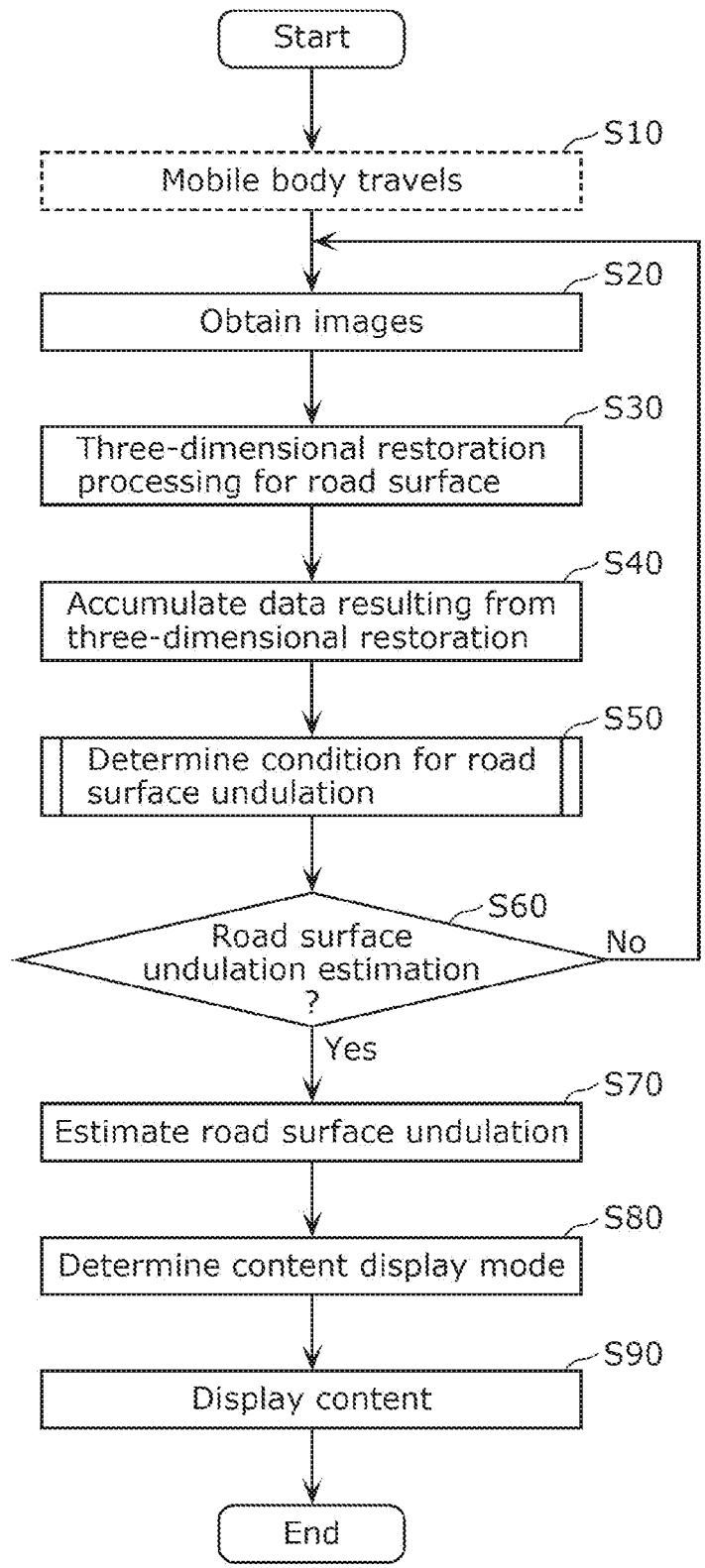
FIG. 9 is a flowchart illustrating operations of the display system according to the embodiment.

Now, operations in display system 1 configured as above will be described with reference to FIGS. 9 to 11. FIG. 9 is a flowchart illustrating operations (a display method) of display system 1 according to the embodiment.

As illustrated in FIG. 9, when mobile body 100 starts traveling (S10), image obtainer 11 obtains images of the area ahead of mobile body 100 captured by imager 110 (S20).

Based on the images, road surface undulation calculator 12 performs the three-dimensional restoration processing for the road surface ahead of mobile body 100 (S30). Road surface undulation calculator 12 calculates, based on the images, road surface undulation information items including the relative positions at respective points as illustrated in figures such as FIG. 2A, and accumulates the road surface undulation information items (data) calculated (S40). Road surface undulation calculator 12 stores the calculated road surface undulation information items in storage (not shown).

Road surface undulation calculator 12 determines the condition for the road surface undulation (S50). Road surface undulation calculator 12 determines a predetermined condition or a combination of predetermined conditions for use in estimating the road surface undulation.

Figure 10:
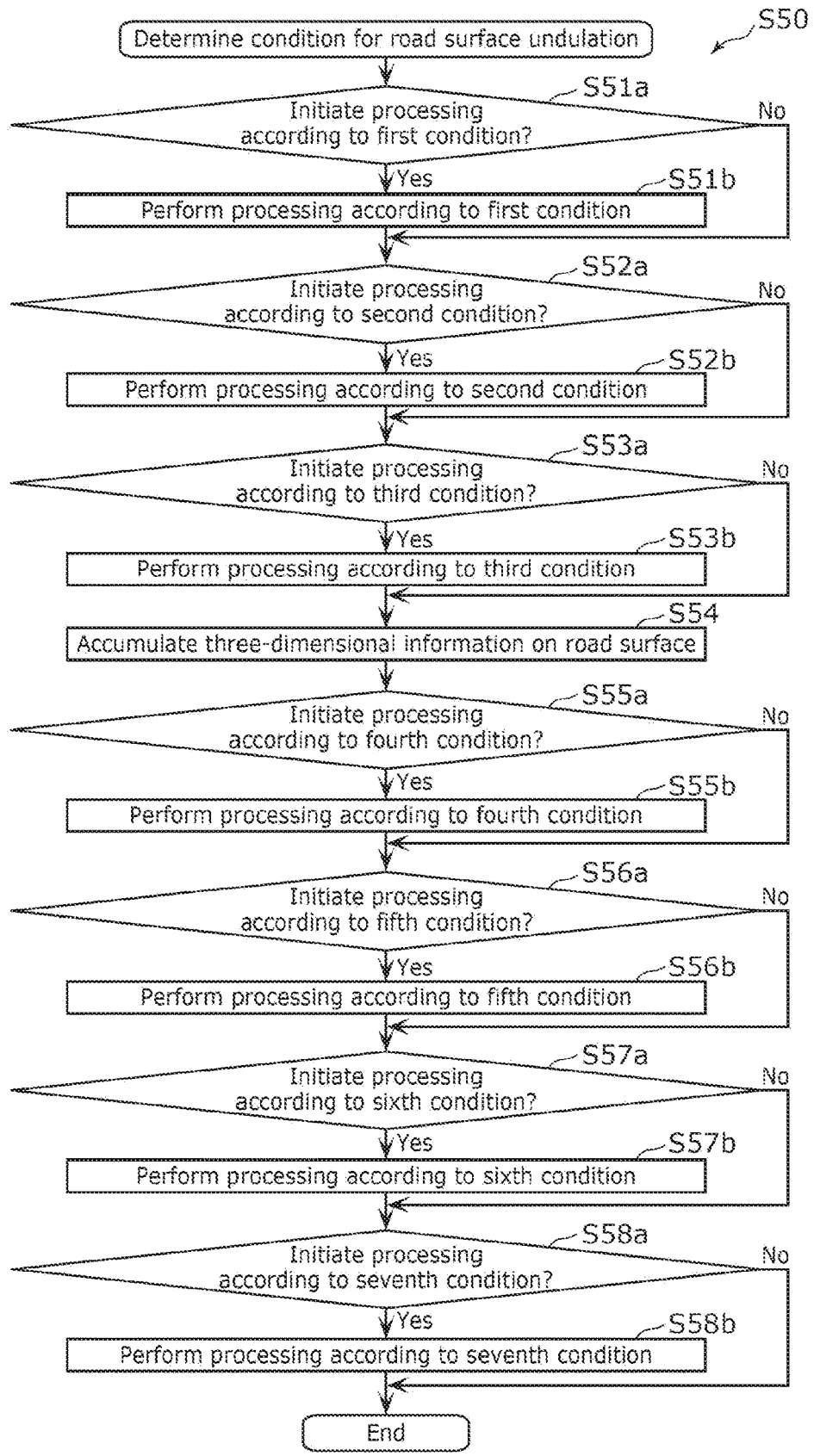
FIG. 10 is a flowchart illustrating the details of step S50 shown in FIG. 9.

FIG. 10 is a flowchart illustrating the details of step S50 shown in FIG. 9.

As illustrated in FIG. 10, road surface undulation corrector 13 determines, based on the number of road surface undulation information items estimated by road surface undulation calculator 12, whether to perform processing according to the first condition (S51a). For example, if the number of road surface undulation information items is greater than or equal to a first predetermined number, road surface undulation corrector 13 determines to perform the processing according to the first condition (Yes at S51a); otherwise, road surface undulation corrector 13 determines not to perform the processing according to the first condition (No at S51a). If step S51a results in Yes, the process proceeds to step S51b. If step S51a results in No, the process proceeds to step S52a. The number of road surface undulation information items here is the number of road surface undulation information items calculated by road surface undulation calculator 12, that is, the number of road surface undulation information items including the items both inside and outside a predetermined range.

At step S51b, road surface undulation corrector 13, as illustrated in FIGS. 2A and 2B, determines whether the road surface undulation information items are within the threshold range in each of the horizontal, vertical, and depth directions, and excludes items outside the threshold range.

Next, road surface undulation corrector 13 determines, based on the number of road surface undulation information items estimated by road surface undulation calculator 12, whether to perform processing according to the second condition (S52a). For example, if the number of road surface undulation information items is smaller than a second predetermined number, road surface undulation corrector 13 determines to perform the processing according to the second condition (Yes at S52a); otherwise, road surface undulation corrector 13 determines not to perform the processing according to the second condition (No at S52a). If step S52a results in Yes, the process proceeds to step S52b. If step S52a results in No, the process proceeds to step S53a. The number of road surface undulation information items here is the number of road surface undulation information items determined to be within the predetermined range. The second predetermined number may be the same as, greater than, or smaller than the first predetermined number.

At step S52b, road surface undulation corrector 13, as illustrated in FIGS. 3A and 3B, performs processing of offsetting, by a predetermined value, the height-direction (vertical) positions of road surface undulation information items having horizontal positions outside a predetermined threshold range, thereby increasing the number of road surface undulation information items for use in estimating the road surface undulation. For example, road surface undulation corrector 13 performs processing of increasing the number of road surface undulation information items to the second predetermined number or more.

Next, road surface undulation corrector 13 determines, based on the number of road surface undulation information items estimated by road surface undulation calculator 12, whether to perform processing according to the third condition (S53a). For example, if the number of road surface undulation information items close to mobile body 100 is greater than or equal to a third predetermined number, road surface undulation corrector 13 determines to perform the processing according to the third condition (Yes at S53a); otherwise, road surface undulation corrector 13 determines not to perform the processing according to the third condition (No at S53a). If step S53a results in Yes, the process proceeds to step S53b. If step S53a results in No, the process proceeds to step S54.

At step S53b, road surface undulation corrector 13, as illustrated in FIGS. 4A and 4B, determines whether the difference between the road surface undulation information item at each of three adjacent points and the items at each of the other two points is within a predetermined threshold range. Road surface undulation corrector 13 excludes road surface undulation information items such that the number of times the difference is outside the predetermined threshold range is greater than or equal to a predetermined number.

Now, road surface undulation corrector 13 accumulates three-dimensional information on the road surface (S54). As the three-dimensional information on the road surface, road surface undulation corrector 13 may store, in storage, the road surface undulation information items before excluding items as illustrated in figures such as FIG. 2A, or the road surface undulation information items after excluding items as illustrated in figures such as FIG. 2B.

Next, road surface undulation corrector 13 determines, based on the number of road surface undulation information items estimated by road surface undulation calculator 12, whether to perform processing according to the fourth condition (S55a). For example, if the number of road surface undulation information items is greater than or equal to a fourth predetermined number, road surface undulation corrector 13 determines to perform the processing according to the fourth condition (Yes at S55a); otherwise, road surface undulation corrector 13 determines not to perform the processing according to the fourth condition (No at S55a). If step S55a results in Yes, the process proceeds to step S55b. If step S55a results in No, the process proceeds to step S56a. The number of road surface undulation information items here is the number of road surface undulation information items estimated by road surface undulation calculator 12. The fourth predetermined number may be the same as any one of the first to third predetermined numbers or different from all these predetermined numbers.

At step S55b, road surface undulation corrector 13, as illustrated in FIG. 5, calculates a first approximation curve based on the road surface undulation information items estimated by road surface undulation calculator 12. Road surface undulation corrector 13 determines whether each of the road surface undulation information items is within a predetermined threshold range with respect to the first approximation curve, and excludes items outside the predetermined threshold range.

Next, road surface undulation corrector 13 determines, based on the number of road surface undulation information items estimated by road surface undulation calculator 12, whether to perform processing according to the fifth condition (S56a). For example, if the number of road surface undulation information items is greater than or equal to a fifth predetermined number, road surface undulation corrector 13 determines to perform the processing according to the fifth condition (Yes at S56a); otherwise, road surface undulation corrector 13 determines not to perform the processing according to the fifth condition (No at S56a). If step S56a results in Yes, the process proceeds to step S56b. If step S56a results in No, the process proceeds to step S57a. The number of road surface undulation information items here is the number of road surface undulation information items estimated by road surface undulation calculator 12. The fifth predetermined number may be the same as any one of the first to fourth predetermined numbers or different from all these predetermined numbers.

At step S56b, road surface undulation corrector 13, as illustrated in FIG. 6, calculates values (see (b) in FIG. 6) by smoothing the road surface undulation information items estimated at the current time by road surface undulation calculator 12 ("result of estimation from current mobile body position" illustrated in (a) in FIG. 6) and the road surface undulation information items estimated in the past by road surface undulation calculator 12 ("result of estimation from past mobile body position" illustrated in (a) in FIG. 6). The two sets of road surface undulation information items used here are the road surface undulation information items before being subjected to processing such as excluding items and smoothing (e.g., the road surface undulation information items estimated by road surface undulation calculator 12).

Next, road surface undulation corrector 13 determines, based on the number of road surface undulation information items estimated by road surface undulation calculator 12, whether to perform processing according to the sixth condition (S57a). For example, if the number of road surface undulation information items is greater than or equal to a sixth predetermined number, road surface undulation corrector 13 determines to perform the processing according to the sixth condition (Yes at S57*a*); otherwise, road surface undulation corrector 13 determines not to perform the processing according to the sixth condition (No at S57*a*). If step S57*a* results in Yes, the process proceeds to step S57*b*. If step S57*a* results in No, the process proceeds to step S58*a*. The number of road surface undulation information items here is the number of road surface undulation information items estimated by road surface undulation calculator 12. The sixth predetermined number may be the same as any one of the first to fifth predetermined numbers (e.g., the fifth predetermined number) or different from all these predetermined numbers.

At step S57*b*, road surface undulation corrector 13, as illustrated in FIG. 7, calculates values (see (b) in FIG. 7) by smoothing the following items: the road surface undulation information items estimated at the current time by road surface undulation calculator 12 ("result of estimation from current mobile body position" illustrated in (a) in FIG. 7); the road surface undulation information items estimated at a first time point in the past by road surface undulation calculator 12 ("result of estimation from mobile body position at Past 1" illustrated in (a) in FIG. 7); and the road surface undulation information items estimated at a second time point in the past by road surface undulation calculator 12 ("result of estimation from mobile body position at Past 2" illustrated in (a) in FIG. 7). The three sets of road surface undulation information items used here are the road surface undulation information items before being subjected to processing such as excluding items and smoothing (e.g., the road surface undulation information items estimated by road surface undulation calculator 12).

Next, road surface undulation corrector 13 determines, based on the number of road surface undulation information items estimated by road surface undulation calculator 12, whether to perform processing according to the seventh condition (S58*a*). For example, if the number of road surface undulation information items is greater than or equal to a seventh predetermined number, road surface undulation corrector 13 determines to perform the processing according to the seventh condition (Yes at S58*a*); otherwise, road surface undulation corrector 13 determines not to perform the processing according to the seventh condition (No at S58*a*). If step S58*a* results in Yes, the process proceeds to step S58*b*. If step S58*a* results in No, the process at step S50 terminates. The number of road surface undulation information items here is the number of road surface undulation information items estimated by road surface undulation calculator 12. The seventh predetermined number may be the same as any one of the first to sixth predetermined numbers or different from all these predetermined numbers.

At step S58*b*, road surface undulation corrector 13, as illustrated in FIG. 8, calculates, for each pair of corresponding points, the difference of the road surface undulation information item estimated at the current time by road surface undulation calculator 12 ("result of estimation from current mobile body position" illustrated in (a) in FIG. 8) from the road surface undulation information item estimated in the past by road surface undulation calculator 12 ("result of estimation from past mobile body position" illustrated in (a) in FIG. 8). Road surface undulation corrector 13 determines whether the difference calculated is within a predetermined threshold range, and if the difference is outside the predetermined threshold range, excludes the road surface undulation information item.

Referring again to FIG. 9, road surface undulation corrector 13 determines, based on the road surface undulation information items estimated by the processing at step S50, determines whether to estimate the road surface undulation (S60). For example, if any of the fifth to seventh conditions is to be used, road surface undulation corrector 13 performs the determination at step S60 based on whether a required number of past road surface undulation information items are stored. If the required number of past road surface undulation information items are stored, road surface undulation corrector 13 determines to estimate the road surface undulation (Yes at S60) and proceeds to step S70. If the required number of past road surface undulation information items are not stored, road surface undulation corrector 13 determines not to estimate the road surface undulation (No at S60) and returns to step S20, from which the process continues.

If none of the fifth to seventh conditions is to be used, the determination processing at step S60 may be skipped.

Road surface undulation corrector 13 estimates the road surface undulation (S70) based on the road surface undulation information items estimated by the processing at step S50. For example, with reference to FIG. 11, the following describes the estimation of the road surface undulation in the case where step S50 results in No at steps S51*a* to S53*a* and steps S55*a* to S56*a*, and Yes at steps S57*a* and S58*a*. FIG. 11 is a diagram for describing an example of excluding road surface undulation information items using a combination of conditions according to the embodiment.

Figure 11:
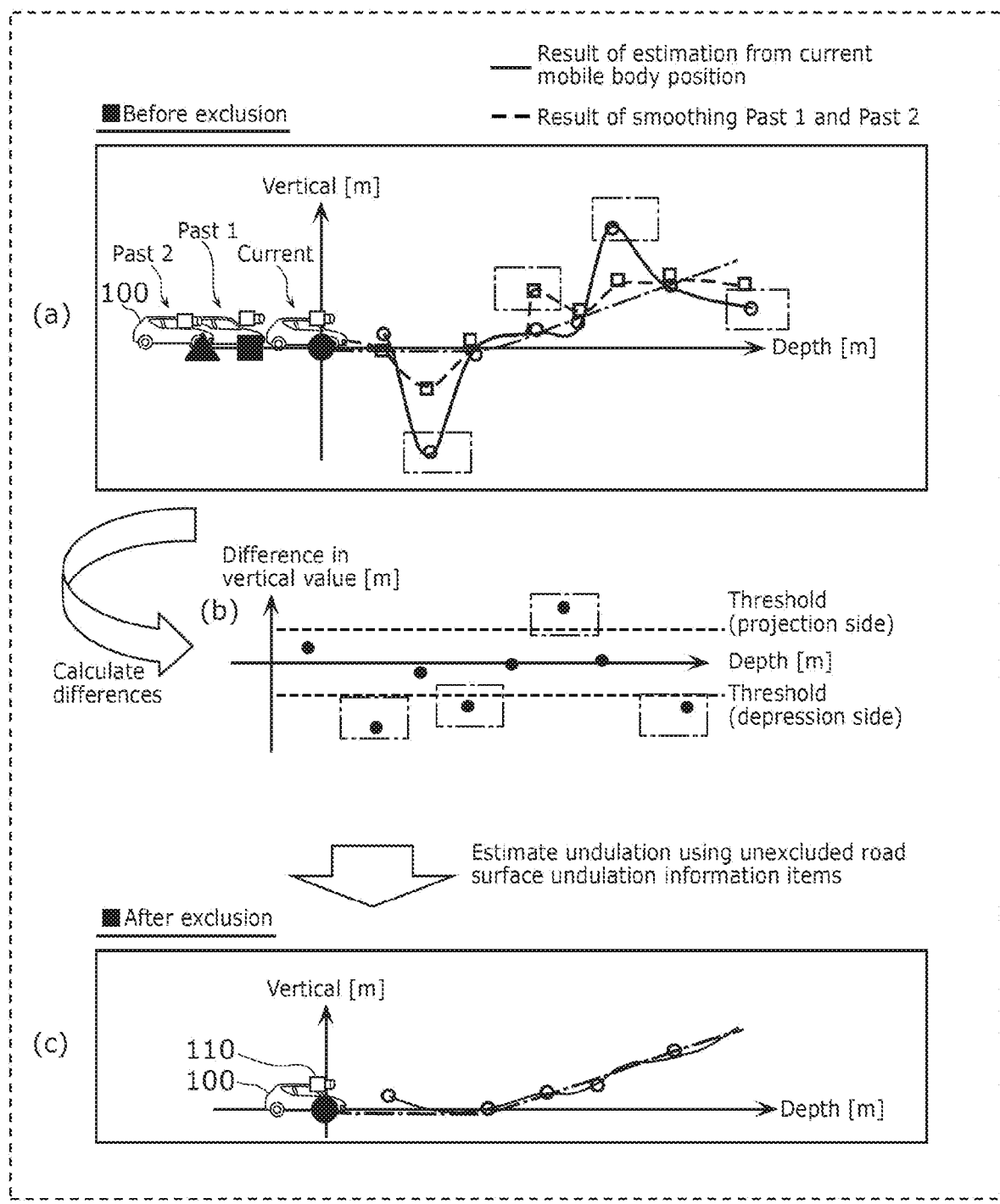
FIG. 11 is a diagram for describing an example of excluding road surface undulation information items using a combination of conditions according to the embodiment.

(a) in FIG. 11 illustrates road surface undulation information items estimated at the current time by road surface undulation calculator 12 ("result of estimation from current mobile body position" illustrated in (a) in FIG. 11: a solid line), and road surface undulation information items obtained by smoothing (e.g., averaging) road surface undulation information items estimated at first and second time points in the past by road surface undulation calculator 12 ("result of smoothing Past 1 and Past 2" illustrated in (a) in FIG. 11: a dashed line). Road surface undulation corrector 13 smooths the road surface undulation information items estimated at the first and second time points in the past.

(b) in FIG. 11 illustrates the result of calculating the differences of the currently estimated road surface undulation information items from the smoothed past road surface undulation information items. Each difference illustrated in FIG. 11 is obtained by calculating the difference between the two road surface undulation information items at a pair of corresponding points (e.g., corresponding points in the depth direction).

(c) in FIG. 11 illustrates the result of estimating the road surface undulation by road surface undulation corrector 13. Road surface undulation corrector 13 estimates the road surface undulation using only road surface undulation information items having differences within a predetermined threshold range (differences not surrounded by a dashed-line frame) among the differences shown in (b) in FIG. 11. For example, as illustrated in FIG. 11, road surface undulation corrector 13 excludes items having differences greater than the projection-side threshold and items having differences smaller than the depression-side threshold, and estimates the road surface undulation using the unexcluded items. Road surface undulation corrector 13 outputs the estimated road surface undulation to display mode determination device 20.

Referring again to FIG. 9, display mode determination device 20 determines the display mode of content (display data) obtained from outside (S80). Display mode determination device 20 determines the superimposing position of the content (a display position on display device 30) based at least on the road surface undulation estimated. Display mode determination device 20 outputs, to display device 30, the content display mode determined.

Display device 30 displays the content in the display mode determined by display mode determination device 20 (S90). In the embodiment, display device 30 displays the content at the superimposing position determined by display mode determination device 20. As described above, road surface undulation estimation device 10 can accurately estimate the road surface undulation using the road surface undulation information items that satisfy the predetermined condition. Consequently, the superimposing position of the content can be accurately determined. This can prevent misalignment of the content with the superimposing position due to causes such as low accuracy of road surface undulation estimation, and thus can prevent the user from erroneously recognizing information or having an odd feeling when looking at the content.

Variations of Embodiment

With reference to FIGS. 12 to 15, other examples of the thresholds will be described below as variations of the embodiment. FIGS. 12 to 15 are diagrams illustrating examples of thresholds according to the variations of the embodiment.

Figure 12:
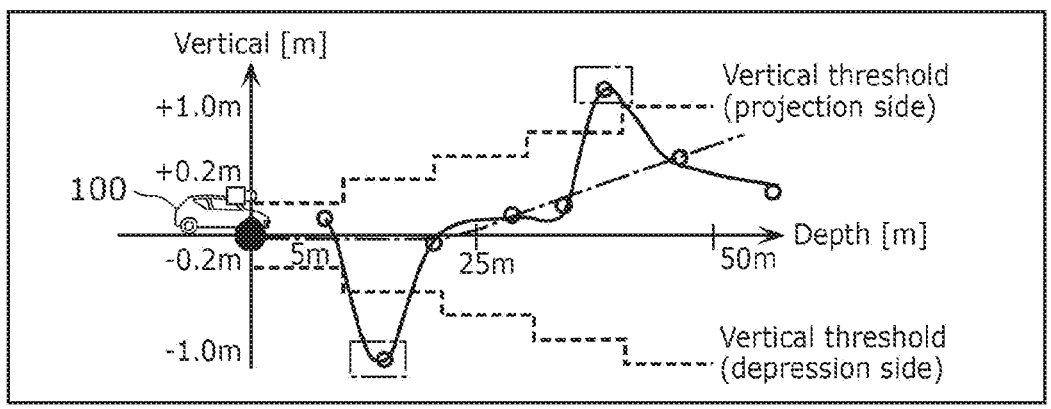
FIG. 12 is a diagram illustrating a first example of thresholds according to a variation of the embodiment.
Figure 13:
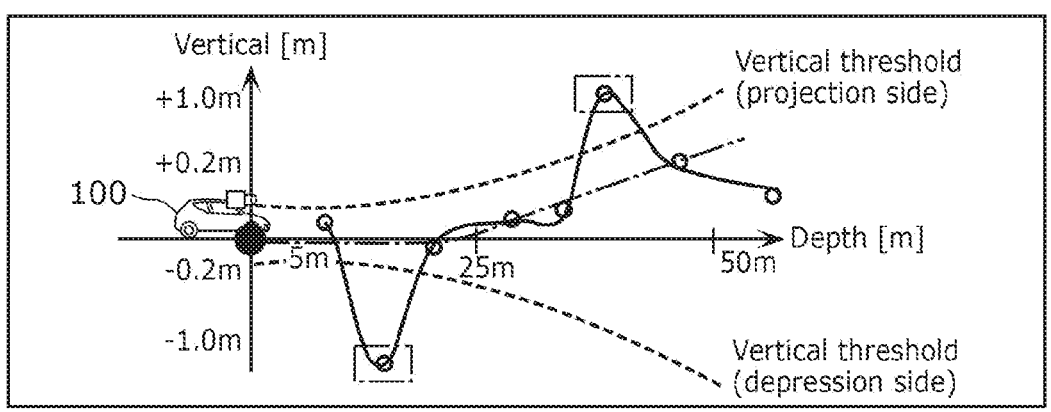
FIG. 13 is a diagram illustrating a second example of thresholds according to a variation of the embodiment.

As illustrated in FIGS. 12 and 13, the thresholds in the vertical direction may increase in absolute value (i.e., the range may become wider) as the depth increases. The thresholds in the vertical direction may be stepwise as illustrated in FIG. 12 or radial as illustrated in FIG. 13. Similarly, the thresholds in the horizontal direction may increase as the depth increases.

Figure 14:
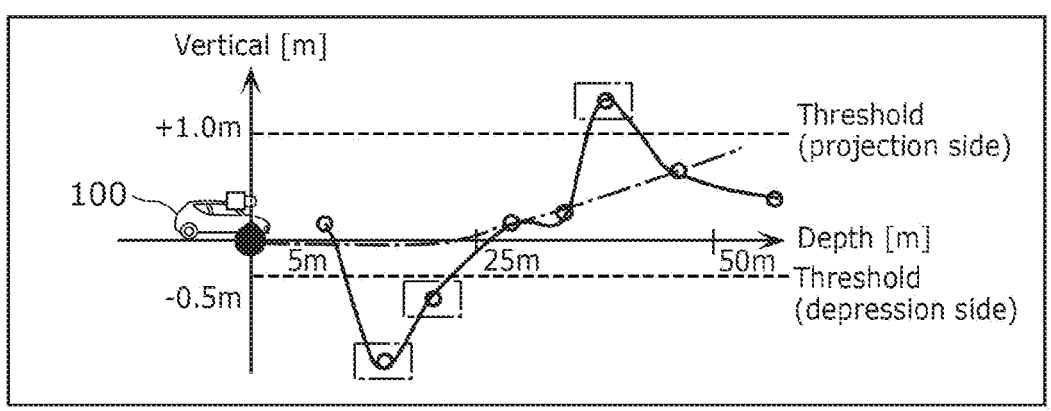
FIG. 14 is a diagram illustrating a third example of thresholds according to a variation of the embodiment.

As illustrated in FIG. 14, the thresholds in the vertical direction may be different in degree on the projection side and the depression side. For example, the upper (projection-side) threshold may be greater than the lower (depression-side) threshold in absolute value. Inaccurately estimated downward (depression-side) undulation tends to cause the user to have an odd feeling when looking at the content superimposed by display device 30, compared with inaccurately estimated upward (projection-side) undulation. By setting the depression-side threshold smaller than the projection-side threshold in absolute value as illustrated in FIG. 14, the user can be effectively prevented from having such an odd feeling.

Figure 15:
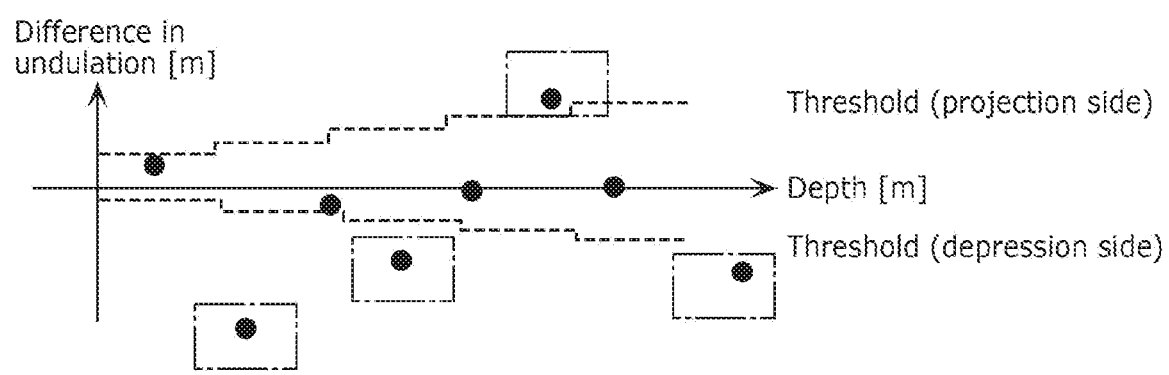
FIG. 15 is a diagram illustrating a fourth example of thresholds according to a variation of the embodiment.

As illustrated in FIG. 15, the thresholds for the difference in undulation (e.g., the difference in vertical value) may also increase as the depth increases, as in FIG. 12. Although the example in FIG. 15 illustrates the thresholds increasing stepwise as the depth increases, the thresholds may increase radially (e.g., see FIG. 13) as the depth increases.

Other Embodiments

Although a display system according to one or more aspects of the present disclosure has been described based on an embodiment, the present disclosure is not limited to this embodiment. Those skilled in the art will readily appreciate that embodiments arrived at by making various modifications to the above embodiment or embodiments arrived at by selectively combining elements disclosed in the above embodiment without materially departing from the scope of the present disclosure may be included within one or more aspects of the present disclosure.

For example, although the above embodiment has described an example involving the determination steps illustrated in FIG. 10, this is not limitative. Alternatively, the storage may store a table in which road scenes (e.g., vehicle speeds) are each associated with one of the first to seventh conditions to be used. Based on the current road scene and the table, the road surface undulation corrector may determine the condition for performing the processing.

The road surface undulation estimation device in the above embodiment may be implemented as a separate device. Further, the road surface undulation estimation device does not necessarily need to be provided in the mobile body but may be located remotely from the mobile body.

Each of the elements in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

An order of performing the steps in each of the flowcharts is an example for explaining the present disclosure in detail. The steps may be performed in different orders. Different steps among the steps may be performed simultaneously, in other words, in parallel.

The dividing of the functional blocks in each of the block diagrams is one example. It is possible that a plurality of functional blocks are implemented into a single functional block, that a single functional block is divided into a plurality of functional blocks, and that a function executed by a functional block is partially executed by another functional block. Furthermore, similar functions of a plurality of functional blocks may be executed by a single hardware or software in parallel or by time division.

The display system according to the above-described embodiment or the like may be implemented to a single device or to a plurality of devices. When the display system is implemented to a plurality of devices, a way of allocating the structural elements included in the display system to the devices is not limited. When the display system is implemented to a plurality of devices, a communication method between the devices is not limited. The communication method may be wireless communications or wired communications. Furthermore, it is possible to combine wireless communication and wired communication to perform communication between the devices.

In addition, each of the structural elements described in the above-described embodiment may be implemented to software. Typically, the structural elements may be implemented to LSIs that are integrated circuits. These integrated circuits may be formed as separate chips, or may be formed as one chip so as to include the entire configuration or part of the configuration of each embodiment. LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology.

A system LSI circuit is a multifunctional LSI circuit manufactured by integrating a plurality of units on a single chip, and is specifically a computer system including, for example, a microprocessor, ROM (Read Only Memory), and RAM (Random Access Memory). A computer program is stored in the ROM. The system LSI circuit achieves its function as a result of the microprocessor operating according to the computer program.

Furthermore, an aspect of the present disclosure may be implemented to a computer program that causes a computer to execute the characteristic steps included in the display method illustrated in one of FIG. 9 and FIG. 10.

For example, the program may be a program to be executed by the computer. Furthermore, an aspect of the present disclosure may be a non-transitory computer-readable recording medium on which such a program is recorded. For example, such a program may be recorded onto a recording medium and distributed. For example, it is possible that such a distributed program is installed in a device having another processor and executed by the other processor so as to allow the other processor to perform the above-described steps of the processing.

While the embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-043255 filed on Mar. 17, 2023.

INDUSTRIAL APPLICABILITY

The present disclosure is applicable to display systems and other implementations that display content superimposed on the foreground.

The invention claimed is:

1. A display system comprising:
   a road surface undulation estimation that estimates undulation of a road surface;
   a superimposing position determination that determines, based on the undulation estimated by the road surface undulation estimation, a superimposing position at which a content is to be displayed by being superimposed on a foreground; and
   a display that displays the content with the content being superimposed on the foreground, at the superimposing position determined by the superimposing position determination, wherein
   the road surface undulation estimation includes:
     a road surface undulation information obtaining program obtains a plurality of road surface undulation information items indicating the undulation of the road surface at a plurality of points, the road surface undulation information items being calculated based on a plurality of images generated when an imaging program provided to a mobile body performs image capturing a plurality of times;
     a determination program that determines whether or not each of the plurality of road surface undulation information items obtained by the road surface undulation information obtaining programming satisfies a predetermined condition; and
     an estimation program that estimates the undulation of the road surface based on one or more road surface undulation information items which are determined by the determination program to satisfy the predetermined condition among the plurality of road surface undulation information items;
   wherein each of the plurality of road surface undulation information items includes a relative position of an object with respect to the mobile body, the object being within a capturing range of the imaging program, and
   wherein the predetermined condition is a condition that a change amount between relative positions included in the plurality of road surface undulation information items is within a predetermined threshold range.

2. The display system according to claim 1, wherein each of the plurality of road surface undulation information items includes a relative position of an object with respect to the mobile body, the object being within a capturing range of the imaging program, and
   the predetermined condition is a condition that the relative position is within a predetermined threshold range.

3. The display system according to claim 1, wherein the predetermined condition is a condition that a total number of the plurality of road surface undulation information items is greater than or equal to a predetermined number.

4. The display system according to claim 3, wherein;
   each of the plurality of road surface undulation information items includes a relative position of an object with respect to the mobile body, the object being within a capturing range of the imaging program,
   the relative position includes a position in a width direction along a width of a lane on which the mobile body travels, with respect to a current position of the mobile body in the width direction,
   the determination program (i) determines whether a total number of relative positions included in the plurality of road surface undulation information items is greater than or equal to a predetermined number, and (ii) when the determination program determines that the total number is not greater than or equal to the predetermined number, determines whether or not each of the relative positions is within a predetermined threshold range, and
   the estimation program estimates the undulation of the road surface based on (i) one or more first relative positions being within the predetermined threshold range among the relative positions and (ii) one or more processed second relative positions obtained by performing predetermined processing on one or more second relative positions being outside the predetermined threshold range among the relative positions.

5. The display system according to claim 4, wherein the predetermined processing is processing of offsetting each of the one or more second relative positions by a predetermined reduction amount.

6. The display system according to claim 1, wherein the determination program calculates, for each of three or more sequential relative positions included in the relative positions, a change amount from each of other two or more relative positions among the three or more sequential relative positions, and
   the predetermined condition further includes a condition that a total number of times when the change amount is outside the predetermined threshold range is smaller than a predetermined number.

7. The display system according to claim 1, wherein the determination program calculates a first approximation curve based on the relative positions, and
the predetermined condition is a condition that a change amount of each of the relative positions from the first approximation curve is within the predetermined threshold range.

8. The display system according to claim 1, wherein each of the plurality of road surface undulation information items includes a relative position of an object with respect to the mobile body, the object being within a capturing range of the imaging program, and
the predetermined condition is a condition that the relative positions to be used in the estimating of the undulation of the road surface are positions obtained by performing smoothing based on (i) first relative positions being the relative positions obtained at a current time and (ii) second relative positions being the relative positions estimated in past.

9. The display system according to claim 8, wherein the second relative positions have been estimated at a first time point in past, and
the predetermined condition is a condition that the relative positions to be used in the estimating of the undulation of the road surface are positions obtained by performing smoothing based on the first relative positions, the second relative positions, and third relative positions being the relative positions estimated at a second time point in past.

10. The display system according to claim 1, wherein each of the plurality of road surface undulation information items includes a relative position of an object with respect to the mobile body, the object being within a capturing range of the imaging program, and
the predetermined condition is a condition that a difference between first relative positions and second relative positions is within a predetermined threshold range, the first relative positions being relative positions included in the plurality of road surface undulation information items and being obtained at a current time, the second relative positions being relative positions included in the plurality of road surface undulation information items and having been estimated in past.

11. The display system according to claim 2, wherein the relative position includes a position in a height direction along a height of the mobile body with respect to a current position of the mobile body in the height direction, and
the predetermined threshold range is determined based on an acceptable road gradient.

12. The display system according to claim 2, wherein the relative position includes a position in a width direction along a width of a lane on which the mobile body travels with respect to a current position of the mobile body in the width direction, and
the predetermined threshold range is determined based on the width of the lane.

13. The display system according to claim 2, wherein the relative position includes a position in a moving direction of the mobile body with respect to a current position of the mobile body in the moving direction, and
the predetermined threshold range is determined based on performance of the imaging program.

14. A road surface undulation estimation device comprising:
a road surface undulation information program that obtains a plurality of road surface undulation information items indicating the undulation of the road surface at a plurality of points, the road surface undulation information items being calculated based on a plurality of images generated when an imaging program provided to a mobile body performs image capturing a plurality of times;
a determination program that determines whether or not each of the plurality of road surface undulation information items obtained by the road surface undulation information program satisfies a predetermined condition; and
an estimation program that estimates the undulation of the road surface based on one or more road surface undulation information items which are determined by the determination program to satisfy the predetermined condition among the plurality of road surface undulation information items;
wherein each of the plurality of road surface undulation information items includes a relative position of an object with respect to the mobile body, the object being within a capturing range of the imaging program, and
wherein the predetermined condition is a condition that a change amount between relative positions included in the plurality of road surface undulation information items is within a predetermined threshold range.

15. A display method comprising:
obtaining a plurality of road surface undulation information items indicating the undulation of the road surface at a plurality of points, the road surface undulation information items being calculated based on a plurality of images generated when an imaging program provided to a mobile body performs image capturing a plurality of times;
determining whether or not each of the plurality of road surface undulation information items obtained in the obtaining satisfies a predetermined condition;
estimating the undulation of the road surface based on one or more road surface undulation information items which are determined in the determining to satisfy the predetermined condition among the plurality of road surface undulation information items;
determining, based on the undulation estimated, a superimposing position at which a content is to be displayed by being superimposed on a foreground; and
displaying the content with the content being superimposed on the foreground, at the superimposing position determined;
wherein each of the plurality of road surface undulation information items includes a relative position of an object with respect to the mobile body, the object being within a capturing range of the imaging program, and
wherein the predetermined condition is a condition that a change amount between relative positions included in the plurality of road surface undulation information items is within a predetermined threshold range.

* * * * *